United States Patent
Suyama et al.

(10) Patent No.: US 7,865,737 B2
(45) Date of Patent: Jan. 4, 2011

(54) DIGITAL MIXER

(75) Inventors: Akio Suyama, Hamamatsu (JP);
Masaru Aiso, Hamamatsu (JP); Kotaro Terada, Hamamatsu (JP); Masaaki Okabayashi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1131 days.

(21) Appl. No.: 11/515,511

(22) Filed: Sep. 1, 2006

(65) Prior Publication Data
US 2007/0053529 A1   Mar. 8, 2007

(30) Foreign Application Priority Data

| Sep. 5, 2005 | (JP) | ............................. 2005-256273 |
| Sep. 22, 2005 | (JP) | ............................. 2005-275791 |
| Sep. 22, 2005 | (JP) | ............................. 2005-275792 |
| Sep. 22, 2005 | (JP) | ............................. 2005-275793 |

(51) Int. Cl.
*G06F 21/00* (2006.01)
(52) U.S. Cl. ........................... 713/183; 713/185; 726/27
(58) Field of Classification Search .................. 726/27; 713/183; 381/119
See application file for complete search history.

(56) References Cited

U.S. PATENT DOCUMENTS

| 5,901,303 A * | 5/1999 | Chew .......................... 711/115 |
| 5,923,884 A * | 7/1999 | Peyret et al. ................. 717/167 |
| 6,351,817 B1 * | 2/2002 | Flyntz ............................ 726/4 |
| 6,643,783 B2 * | 11/2003 | Flyntz ............................ 726/9 |
| 6,671,698 B2 * | 12/2003 | Pickett et al. ..................... 1/1 |
| 6,681,995 B2 * | 1/2004 | Sukeda et al. ................ 235/492 |
| 6,834,802 B2 * | 12/2004 | Sukeda et al. ............... 235/451 |
| 6,931,379 B1 * | 8/2005 | Sato et al. ...................... 705/50 |
| 7,078,608 B2 | 7/2006 | Aiso et al. |
| 7,370,202 B2 * | 5/2008 | Appenzeller et al. ......... 713/171 |
| 7,520,437 B2 * | 4/2009 | Daniel et al. ................. 235/492 |

(Continued)

FOREIGN PATENT DOCUMENTS

JP      11-052966 A     2/1999

(Continued)

OTHER PUBLICATIONS

"Digital Mixing Engine DME64 Designer Manual", Version 1.2, Yamaha Corporation, Japan 2004, 427 pages.

(Continued)

*Primary Examiner*—David Garcia Cervetti
(74) *Attorney, Agent, or Firm*—Morrison & Foerster LLP

(57) ABSTRACT

The present invention is directed to a digital mixer that selectively provides audio signal processing functions to a user depending on the authority granted to the user's log-in credentials. The preferred embodiment of the digital mixer includes a mounting unit for removably mounting a storage medium, a detector for detecting the mounting or removal of the storage medium, a determining portion for determining whether a user key is stored in the mounted storage medium, and a control portion that, upon the determining portion confirming that the mounted storage medium includes a user key, causes the digital mixer to display a log-on screen for a specific user who is associated with the stored user key. In accordance with the preferred embodiment, the digital mixer automatically logs out the user upon detecting that the storage medium is removed from the digital mixer.

31 Claims, 22 Drawing Sheets

U.S. PATENT DOCUMENTS

| | | | |
|---|---|---|---|
| 7,530,101 B2 * | 5/2009 | Gallo et al. | 726/12 |
| 7,562,989 B2 * | 7/2009 | Ushiro | 353/119 |
| 7,624,433 B1 * | 11/2009 | Clark et al. | 726/9 |
| 2001/0006195 A1 * | 7/2001 | Sukeda et al. | 235/492 |
| 2002/0087868 A1 * | 7/2002 | King et al. | 713/185 |
| 2002/0125328 A1 * | 9/2002 | Sukeda et al. | 235/492 |
| 2004/0123161 A1 * | 6/2004 | Harada et al. | 713/202 |
| 2004/0260416 A1 * | 12/2004 | Kellom et al. | 700/94 |
| 2005/0033699 A1 * | 2/2005 | Umeo et al. | 705/56 |
| 2005/0066069 A1 * | 3/2005 | Kaji | 710/1 |
| 2005/0182971 A1 * | 8/2005 | Ong et al. | 713/202 |
| 2005/0192688 A1 * | 9/2005 | Takemura | 700/94 |
| 2006/0072771 A1 * | 4/2006 | Kloiber et al. | 381/119 |
| 2006/0095771 A1 * | 5/2006 | Appenzeller et al. | 713/171 |
| 2006/0104600 A1 * | 5/2006 | Abrams | 386/46 |
| 2006/0130129 A1 * | 6/2006 | Dai et al. | 726/9 |
| 2006/0152398 A1 * | 7/2006 | Jubien et al. | 341/155 |
| 2008/0170853 A1 * | 7/2008 | Rakib et al. | 398/26 |
| 2008/0285757 A1 * | 11/2008 | Bradley et al. | 380/278 |
| 2009/0327731 A1 * | 12/2009 | Appenzeller et al. | 713/171 |

FOREIGN PATENT DOCUMENTS

| | | |
|---|---|---|
| JP | 2002-251226 A | 9/2002 |
| JP | 2002-268766 A | 9/2002 |
| JP | 2004-247898 A | 9/2004 |
| JP | 2005-202715 A | 7/2005 |

OTHER PUBLICATIONS

Yamaha. (2004). "DME Designer," Version 1.2, Owner's Manual, 427 pages (Documentation software for DME64N/24N Mixing Engine).

Notice of Reason(s) for Rejection mailed Aug. 31, 2010, for JP Application No. 2005-256273, with English Translation, five pages.

Notice of Reason(s) for Rejection mailed Oct. 25, 2010, for JP Application No. 2005-275792, with English Translation, five pages.

Yamaha. (2004). "DM Designer," Version 1.2, Owner's Manual, pp. 11-21, with English Translation, 24 pages.

* cited by examiner

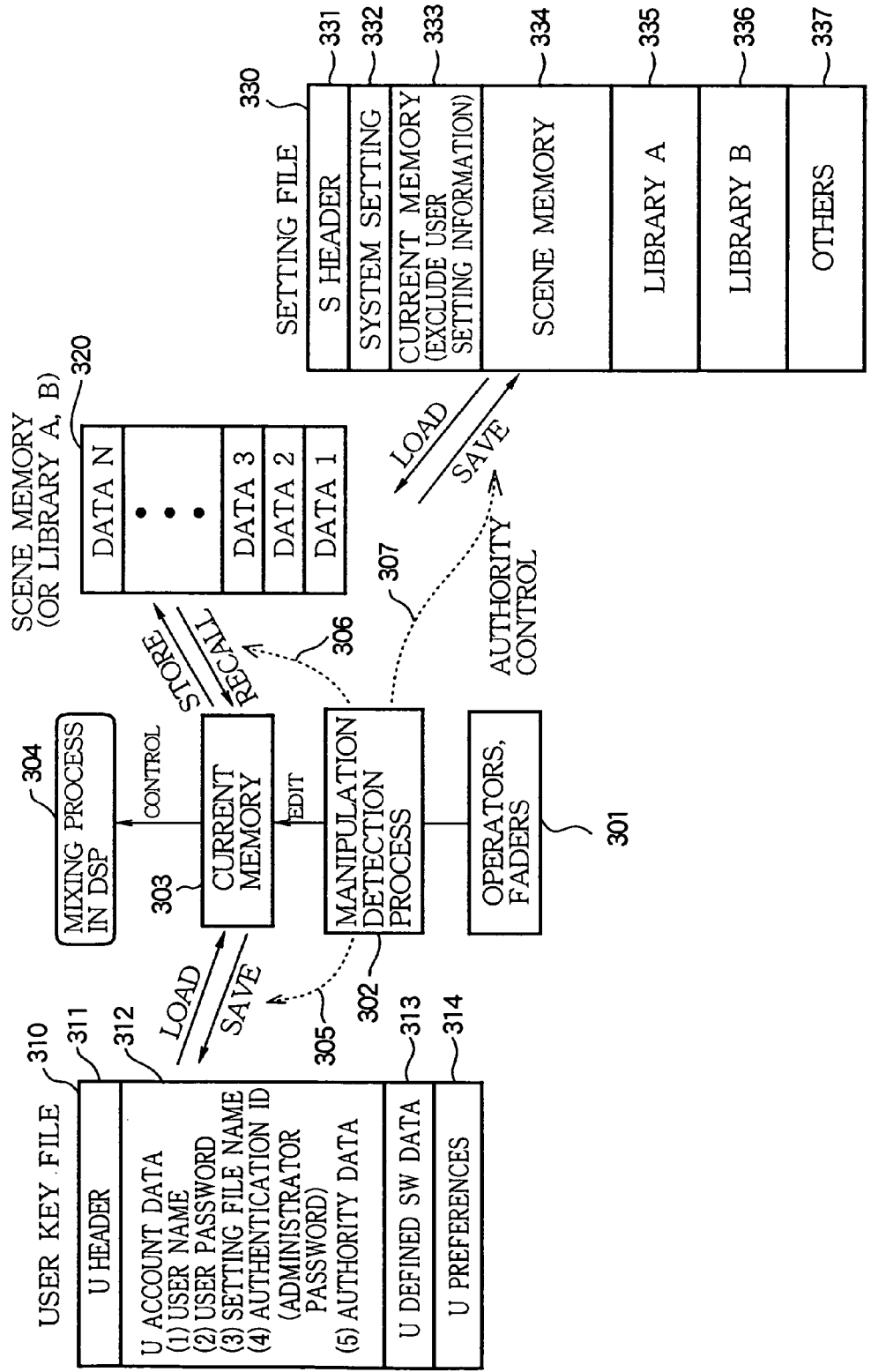

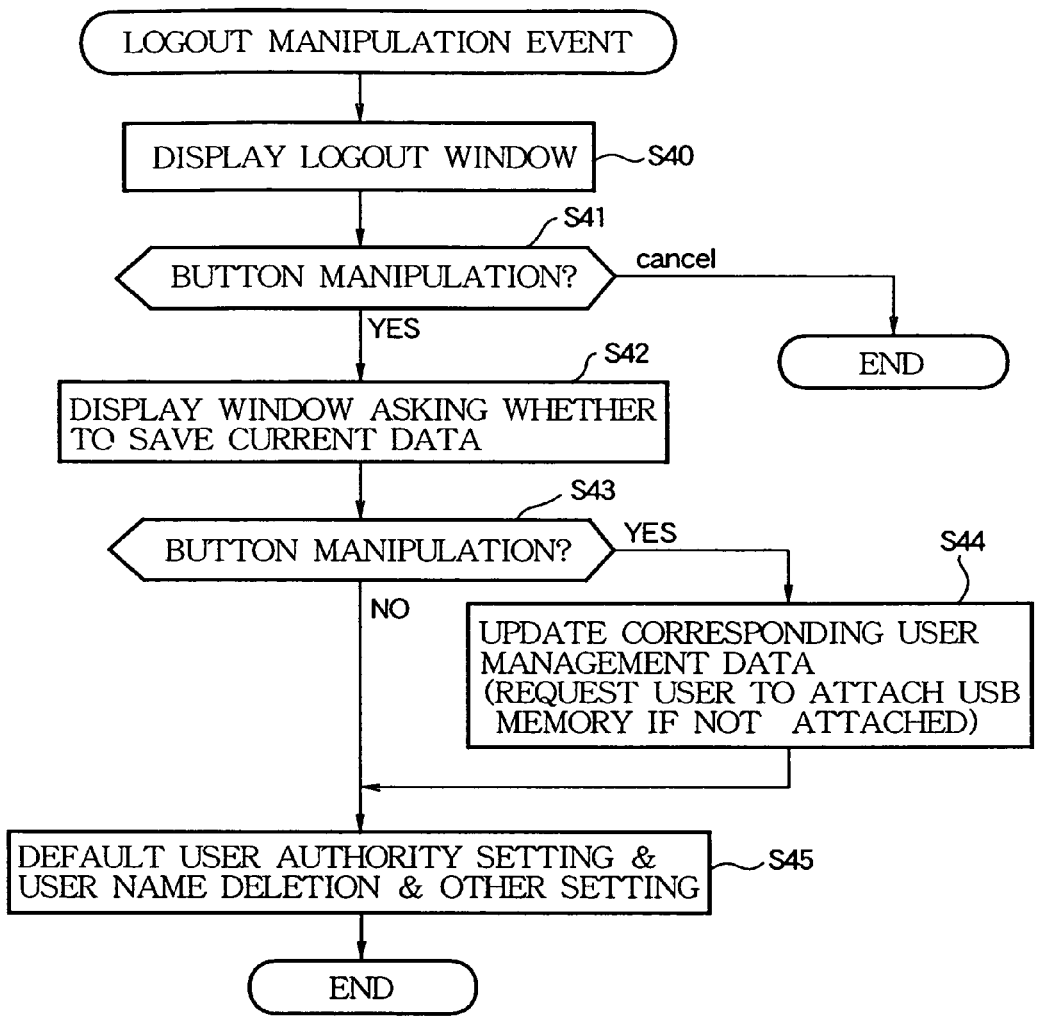

DIGITAL MIXER

BACKGROUND OF THE INVENTION

1. Technical Field of the Invention

The present invention relates to a digital mixer and more particularly to a digital mixer that has a function to log a user into the mixer by mounting a detachable storage medium, in which a corresponding user key is stored, on the mixer.

2. Description of the Related Art

A conventional digital mixer adjusts the level and frequency of audio signals output from a plurality of microphones or electronic instruments, then mixes and groups the audio signals into several groups, and transmits the grouped audio signals to a power amplifier or a variety of recording devices or to an effecter or a player that is being played. An operator of the digital mixer operates a variety of panel operation members on a mixing console while monitoring the output audio signals of the digital mixer. In this manner, the operator adjusts the volume or tone of audio signals such as musical instrument sounds or vocal sounds to bring the digital mixer into a state optimally representing the playing. The digital mixer includes input channels, mixing buses, and output channels. The input channels are a plurality of input signal paths. Signals output from the input channels are mixed on the mixing buses. The output channels are a plurality of output signal paths. The input channels output their input signals to the mixing buses after controlling the frequency balance or the output level of the input signals. Each of the mixing buses mixes and outputs input signals to a corresponding output channel. Each of the output channels outputs the mixed signal input from the mixed bus after controlling the frequency balance or the level of the mixed signal.

A known digital mixer has a login function. One example is described in Non-Patent Reference 1. This mixer provides a variety of functions to a user who has logged into the mixer by inputting a user ID and-password. Some digital mixers can restrict functions that can be used by each user. Some digital mixers having the login function provide a function to lock their manipulation unless the user ID and password is input.

[Non-Patent Reference 1] "DME Designer", Version 1.2, Owner's Manual, 427 pages (Documentation software for DME64N/24N Mixing Engine, Yamaha, 2004).

Some computer systems permit login of a user only when the user logs in by mounting a detachable storage medium such as a USB memory, in which authentication information (a user key) of the user is stored, on the computer system.

However, in the above method by which the user logs into the computer system by mounting a USB memory storing the user key on the computer system, the user must perform a manipulation to input the user ID and password after mounting the USB memory on the computer system and thus the login manipulation is inconvenient.

Further, in some computer systems, the user logs into the system to for use thereof. A guest is defined as a default user. Even the guest must perform a login operation to make use of the system. Some computer system is provided with an automatic login function for automatically designating a user to log in the system.

The digital mixer is a kind of a computer system and may be considered as a device that can be used by someone at any time when the mixer is powered on. However, the conventional login function of the mixer requires a troublesome login manipulation after the mixer is powered on. Using the automatic login function of a computer system makes it possible to automatically log in with a certain user after the power is turned on. However, in this case, there is still a need to perform a troublesome login manipulation after the certain user has logged out.

If the method by which a user logs into a computer system by mounting a detachable USB memory storing a user key is stored, on the computer system is applied to the digital mixer, it is possible to manage the security of the mixer so that a determined user alone is allowed to use a determined mixer. However, a single user may desire to log into and use a mixer of a first studio and another mixer of a second studio. In this case, the user must carry both a USB memory for logging into the mixer of the first studio and another USB memory for logging into the other mixer of the second studio. If a single USB memory is used to deal with such a desire since it is not convenient to carry and manage two USB memories, a user of the mixer of the first mixer could log into the mixer of the second studio with the USB memory. However, when a USB memory storing user keys created with different mixers is mounted on a mixer, the user of the mixer may desire to prevent login with other user key. On the other hand, a user may desire to allow a plurality of mixers associated with the user to be used with the same user key (including a staff user key).

As mentioned before, some known digital mixers with the mixing function have a login function. The login function allows a user to log into the digital mixer by authenticating the user based on a user name and password input by the user. When the user authentication is not performed based on the input user name and password, the digital mixer having the login function can lock its manipulations to prevent the user from manipulating the digital mixer. The digital mixer having the login function can also limit usable functions for each logged-in user.

When a user logs into a digital mixer having such a login function, the user can use the digital mixer within the authority set for the user. In the conventional digital mixer, data of the setting state immediately before login is transferred to a current memory. Therefore, when a user logs into the digital mixer, the digital mixer is brought into the same mixing setting state as that immediately before the login. Even if the user is familiar with manipulating the digital mixer, the user needs to check its current setting state after login. Then, the user must change the current setting state to a desired setting state. Thus, the conventional digital mixer has a problem in that the user cannot quickly manipulate it. In addition, users who are unfamiliar with manipulating the digital mixer may not understand the setting state transferred to the current memory. In this case, the digital mixer has a problem in that the users who are unfamiliar with manipulating the digital mixer may not be able to obtain a desired setting of the digital mixer.

SUMMARY OF THE INVENTION

It is an object of the present invention to provide a digital mixer which provides a variety of functions to a user who has logged into the mixer by mounting a USB memory storing a user key on the mixer, thereby meeting the demand for easy login.

It is another object of the present invention to provide a digital mixer wherein the mixer can be usable by someone at any time without any troublesome manipulation and, when a user has explicitly logged in, the user can use a variety of functions within the limits of the authority granted to the user.

It is a further object of the present invention to provide a digital mixer which provides a variety of audio signal processing functions to a user who has logged into the mixer by mounting a USB memory including a user key stored therein on the mixer, wherein users who are allowed to log into one group of mixers can be differentiated from users who are allowed to log into another group of mixers, so that a mixer can perform authentication to deny login of an unauthorized user of the mixer.

It is also an object of the present invention to provide a digital mixer wherein a user key created with another mixer can be changed to be used as the user key of the corresponding mixer as needed.

It is still another object of the present invention to allow the digital mixer to be brought into a mixing setting state corresponding to a user who has manipulated the digital mixer to log into the digital mixer.

In order to accomplish the above objects, the present invention provides a digital mixer wherein a mounting unit of a detachable storage medium such as a USB memory is provided and, upon detecting that the storage medium has been mounted on the mounting unit, a login screen is displayed if a user key is present in the storage medium, the login screen allowing login of a user corresponding to the user key, thereby making it easy to log into the mixer. When the storage medium is removed, the user, who corresponds to the user key in the storage medium and who has logged in until then, automatically logs out of the mixer. After the logout, the currently logged-in user may be automatically switched to a guest user.

If mounting or removing the storage medium causes login or logout as described above, then the mounting unit of the storage medium is used only for login or logout so that it is not possible to store a created user key in a storage medium or to edit a user key in a storage medium. Thus, in the present invention, when a storage medium is mounted, it is determined whether or not a user key is being created or edited and, if the determination is yes, the automatic login is not performed. When the created or edited user key has been written in the storage medium, a user corresponding to the user key may automatically log in so that it is possible to confirm the operation of the account of the created or edited user key.

In addition, users who are allowed to log in with the user key may include a specific user who has the authority to edit the user key, and, if an instruction to edit a user key is issued when a storage medium including a user key of the specific user stored therein has been mounted on the mounting unit with the specific user logged in, then automatic logout function is suspended to maintain the user key edition authority of the specific user even if it is detected that the storage medium has been removed from the mounting unit.

In order to accomplish the above objects, the present invention provides a digital mixer characterized in that a guest who is a default user having no password is set and, when the mixer is powered on, login is automatically performed with the guest, and, when a logged-in user other than the guest has logged out, the current user returns to the guest. Thus, no login manipulation is performed for login of the guest. At any time, some user is logged into the mixer. That is, any user can always logs into the mixer no matter what state of the mixer. The authority of the guest can be set and changed based on an instruction of a specific user who has a specific authority. This makes it possible to customize the authority of the guest who is referred to as a default user.

It is possible to log in with a user key of a second user other than the guest after login has been performed with a user key of a first user other than the guest. The guest automatically logs in when the second user has logged out. The guest is not allowed to log out when the guest has logged in with the user key of the guest.

In order to accomplish the above objects, the present invention provides a digital mixer characterized in that a password of an administrator of the mixer used by a user is incorporated as an authentication ID into data of a corresponding user key stored in a detachable storage medium such as a USB memory and, when the user logs into the mixer, it is determined whether or not the authentication ID of the user key is identical to the password of the administrator of the mixer, and password authentication is then performed with the user key, provided that the authentication ID of the user key is identical to the password of the administrator.

The user may be prompted to input the password of the administrator of the mixer when it is not confirmed that the authentication ID is identical to the password of the administrator and the login of the user is denied, and the user may be allowed to log in if the user inputs the password of the administrator of the mixer. In this case, the input password of the administrator of the mixer may be written as an authentication ID of the storage medium.

In order to accomplish the objects, the present invention provides a digital mixer including a storage in which user operation data of each user is stored. The primary feature of the digital mixer is that, when a user logs into the digital mixer, the digital mixer reads user operation data corresponding to the logged-in user from the storage and sets the read user operation data in a current memory.

The present invention allows simple login and logout manipulations since the login and logout can be performed by mounting and removing a storage medium such as a USB memory on and from the mixer. In addition, when a user creates or edits a user key and writes it to a storage medium, the current account is not switched until the writing is completed even if the storage medium of the user is removed. This makes it possible to write the created or edited user key to a storage medium. Immediately after the writing, the current account is switched to the account of the created or edited user so that it is possible to immediately confirm the operation of the account thereof. It is also possible to edit a user key of another storage medium even in a mode in which logout is performed upon removing a storage medium.

According to the present invention, login is automatically performed with the guest when the power is turned on, which allows the mixer to be immediately usable without any troublesome manipulation. When a user has explicitly logged in, the user can use a variety of functions within the limits of the authority granted to the user. As the user logs out, the logged-in user returns to the guest. That is, it is possible to return to the guest who is a default user without any troublesome manipulation. When a plurality of users continuously logs in (in the following embodiment, one user can log in after another user logs in if the USB memory contains a plurality of user keys), the logged-in user returns to the guest as the last user logs out, so that, when the current user logs out, there is no need to take into consideration which user has logged in most recently. That is, only two users, the guest and another user, are considered as logged-in users, so that it is easy to determine the logged-in user. In addition, since the guest cannot log out, the mixer can be used under the authority of the guest at any time after a logout manipulation. Thus, the present invention provides a convenient mixer.

According to the present invention, if the same administrator password is set in a plurality of mixers that are used by (i.e., associated with) a user, a corresponding user key can be commonly used with any of the mixers. It is possible to restrict use of the mixers with a user key created with a different mixer since its password is different. If the authentication ID is not identical to the administrator password, it is requested that the user input the password of the administrator of the mixer. It is possible to log in with a user corresponding to the user key if the correct password is input. Thereafter, if a manipulation is performed to update data of the user key in the storage medium, the user key becomes the user key of the mixer. Thus, with a simple manipulation, it is possible to change the user key created with a different mixer to the user key of the mixer.

According to the present invention, the digital mixer stores user operation data of each user in the storage. When a user logs into the digital mixer, the digital mixer reads user operation data corresponding to the logged-in user from the storage and sets the read user operation data in the current memory. Accordingly, when a user logs into the digital mixer, the digital mixer is brought into a setting state that the user has set by themselves. This allows the user to immediately grasp the setting state of the digital mixer and to manipulate the digital mixer accordingly.

In addition, the digital mixer is provided with a plurality of scene data that can be called after login. The digital mixer also handles the user operation data corresponding to the logged-in user as scene data. This allows the digital mixer to call scene data as needed after login and also to call a default setting of the user after login.

An external storage medium in which user management data is stored may be attached to the digital mixer. The digital mixer performs a login process based on user management data stored in the external storage medium to automatically recall user operation data stored in the external storage medium to the current memory. Simply by attaching an external storage medium to the digital mixer, each user can bring the digital mixer into a setting state that the user has set by themselves. This minimizes user management data to be stored in the digital mixer.

The digital mixer has unique device identification information. Using the unique device identification information, the digital mixer authenticates device identification information included in the user management data stored in the external storage medium attached to the digital mixer and permits the login according to the authentication. This allows the digital mixer to prevent login using an external storage medium in which user management data created by a different device of the same type is stored.

In addition, the external storage medium can store a plurality of user management data. This allows a single user to prepare a plurality of dedicated user management data corresponding respectively to scenes. The user can set a mixing process corresponding to each scene using the dedicated user management data of each scene. A user authority of each user management data can be varied according to a scene in which the user management data is used. Accordingly, when a manipulation prohibited for each scene is inadvertently performed, the digital mixer can disable the manipulation, thereby preventing a mistaken manipulation.

BRIEF DESCRIPTION OF THE DRAWINGS

FIG. 3 illustrates how processes of the mixer are controlled based on setting information in the current memory.

FIGS. 7a and 7b are a flow chart of a user key creation and user key account setting procedure and a flow chart of a procedure that is performed when an account setting button of a current user is turned on.

FIG. 16 is a flow chart of a power-on process that the digital mixer according to the present invention performs when it is powered on.

FIG. 18 is a flow chart of a logout manipulation event process, which is an event process in the power-on process that the digital mixer according to the present invention performs.

FIG. 19 illustrates an example window displayed in the logout manipulation process that the digital mixer according to the present invention performs.

DETAILED DESCRIPTION OF THE INVENTION

Embodiments of the present invention will now be described with reference to the drawings.

Figure 1:
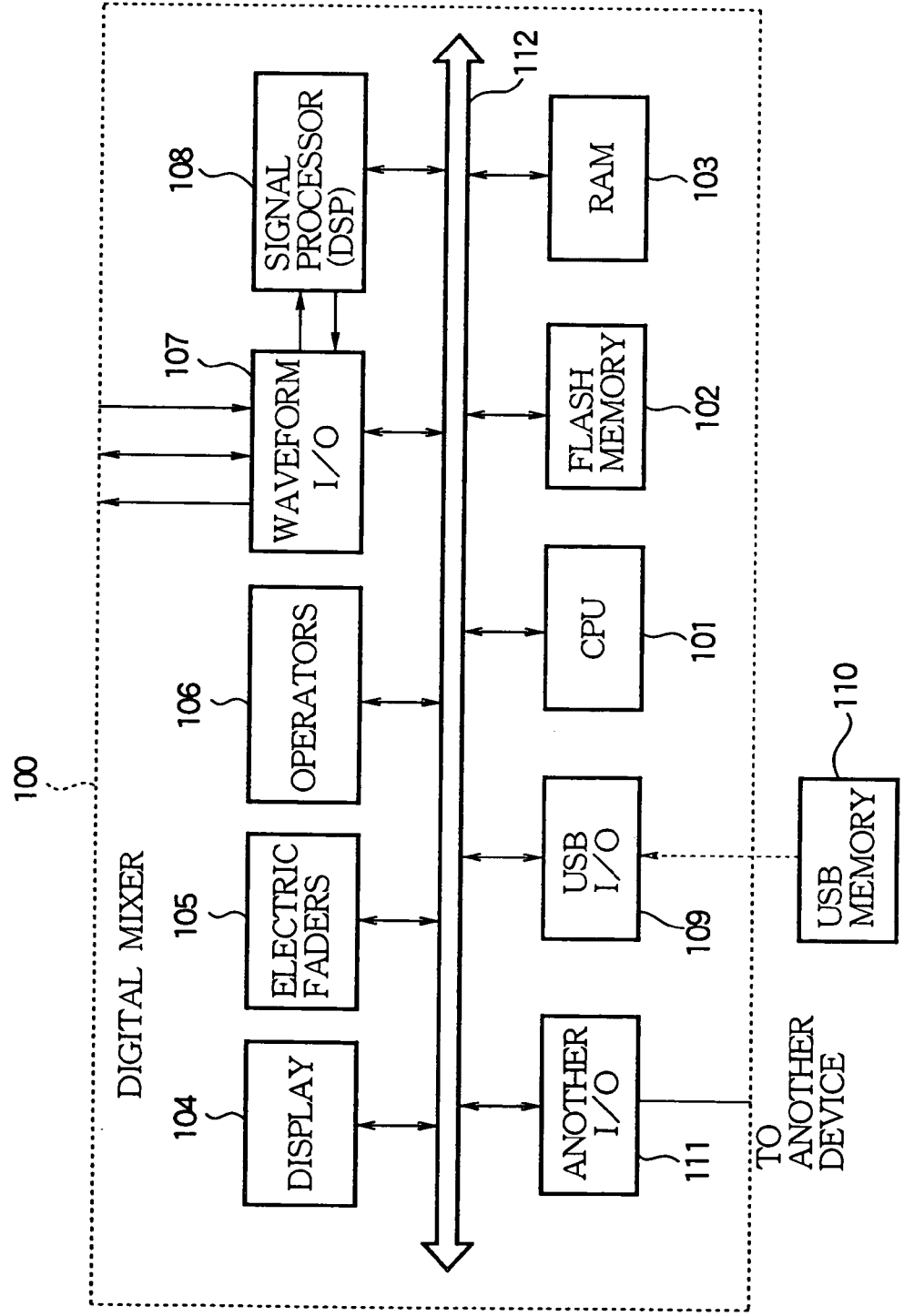
FIG. 1 is a block diagram of a digital mixer according to an embodiment of the present invention.

FIG. 1 is a block diagram of a digital mixer according to an embodiment of the present invention. This mixer 100 includes a central processing unit (CPU) 101, a flash memory 102, a Random Access Memory (RAM) 103, a display 104, electric faders 105, operators 106, a waveform input/output (I/O) interface 107, a signal processor 108, a Universal Serial Bus (USB) I/O interface 109, another I/O interface 111, and a bus line 112.

The CPU 101 is a processing unit that controls overall operations of the mixer. The flash memory 102 is a nonvolatile memory and a machine readable medium that stores a variety of data used for a variety of control processes and computer programs executed by the CPU 101. The nonvolatile memory is a rewritable memory in which stored information is not lost even when the power is off. The RAM 103 is a volatile memory used as a work area or a load area of programs run by the CPU 101. The display 104 is a dot matrix display that displays a variety of information mounted on an external panel of this mixer. The electric faders 105 are operators used to set a variety of parameter values, which are mounted on the external panel of the mixer. The operators 106 are a variety of operators mounted on the external panel of the mixer.

The waveform I/O interface 107 is an input/output interface between the mixer and a variety of input/output devices, recorders, or the like. Examples of the input/output devices include an AD converter card which converts an analog audio signal input from an input device such as a microphone into a digital signal and inputs the digital signal to the mixer, a DA converter card which converts a digital audio signal output from the mixer into an analog signal and outputs the analog signal to a sound system, and the like. The signal processor 108 is a Digital Signal Processor (DSP) that arbitrarily assigns a digital audio signal input via the waveform I/O interface 107 to a plurality of input channels, arbitrarily mixes audio signals of the input channels through a plurality of mixing buses, and outputs the resulting signals through output channels. For each input or output channel, audio volume control can be performed through a fader, frequency characteristics control can be performed through an equalizer, a variety of waveform changing processes can be performed through a compressor or the like, and an effect imparting process can be performed through an effecter. Accordingly, the DSP 108 can perform processes such as mixing, level adjustment, and effect imparting on audio signals input through an input device such as a microphone to record or output the audio signals.

The USB I/O interface 109 is an interface used to connect or insert the USB memory 110 to or into the mixer. A port or mounting unit for mounting or inserting the USB memory 110 is provided on the external panel at a position thereof at which it is easy for the user to insert and remove it into and from the panel. The CPU 101 can detect events such as insertion or removal of the USB memory 110 into or from the USB I/O interface 109. Once the USB memory 110 is connected, the CPU 101 can write and read data to and from the USB memory 110. However, it is desirable that the USB memory do not allow reading and writing unless the mixer accesses the USB memory properly. The I/O interface 111 is an interface through which a variety of external devices such as a computer that externally controls the mixer is connected to the mixer.

Figure 2:
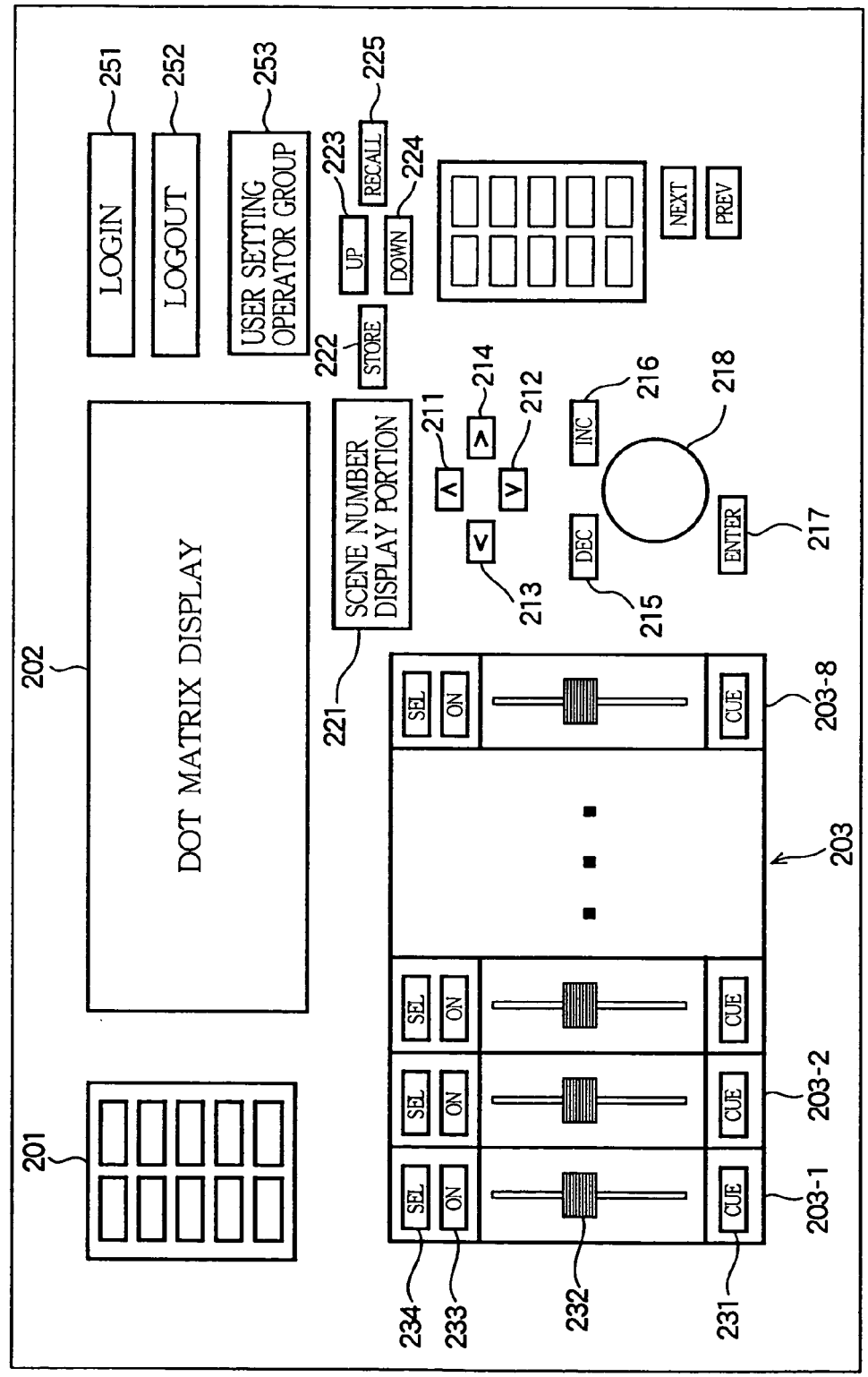
FIG. 2 illustrates an appearance of an external panel of the digital mixer.

FIG. 2 illustrates an appearance of the external panel of the digital mixer 100 of FIG. 1. The display 104, the faders 105, and the operators 106 of FIG. 1 are mounted on the external panel. Reference numeral "201" denotes 10 screen selection switches, "202" denotes a dot matrix display, "203" denotes an assigned channel strip portion, "211" to "214" denote up, down, left, and right cursor moving buttons, "215" denotes a DEC button, "216" denotes an INC button, "217" denotes an enter key, and "218" denotes a wheel. The assigned channel strip portion 203 includes 8 assigned channel strips 203-1 to 203-8. One assigned channel strip (for example, 203-1) includes a CUE switch 231, an electric fader 232, an ON switch 233, and a selection (SEL) switch 234. Each of the other assigned channel strips 203-2 to 203-8 has the same configuration.

When one of the screen selection switches 201 is turned on, a screen corresponding to the switch is displayed and the assigned channel strips 203-1 to 203-8 are assigned to functions according to the displayed screen. For example, when first to eighth input channel selection switches are turned on, the parameter setting states of the first to eighth input channels are displayed on the display 202 and the assigned channel strips 203-1 to 203-8 are assigned as operators that are used to set parameters of the first to eighth input channels. In the same manner, 9th and subsequent input or output channels may also be assigned to the assigned channel strips 203-1 to 203-8 to set their parameters. The electric faders 232 are level control faders of the channels assigned to the assigned channel strips. The ON switches 233 are used to switch on/off signals of the corresponding channels. Each of the SEL switches 234 is used to select one channel as a selection channel from the input and output channels of the mixer. For each of the process blocks of a variety of processes of audio signals of the channels, the display 202 can display a detailed parameter setting screen of the process block for displaying and setting, in detail, process parameters of a channel, which has been selected as a selection channel. The screen selection switch 201 includes a switch used to display such a detailed parameter setting screen.

A cursor is displayed on the detailed parameter setting screen and a parameter is selected when the cursor is set at the parameter. Using the cursor moving buttons 211 to 214, the cursor displayed on the screen can be set at a desired parameter. The DEC button 215, the INC button 216, and the wheel 218 can be operated to change a value of the parameter and the parameter value can be determined using the enter key 217.

As described above, the screen selection switch 201 can be used to switch the screens, and parameters of each channel are set and changed while switching functions of the corresponding channel strip according to the switched screens. On the detailed parameter setting screen, the cursor may be moved to select a parameter and the selected parameter may be set and changed using the operators 215 to 218. Parameters set and changed through these manipulations are stored in the current memory. The current memory is provided in the RAM 103 and current operations of the mixer are determined based on the parameter values set in the current memory.

Reference numerals "221" to "225" denote scene-related display portions and operators. The term "scene" refers to a combination of parameter data items (for example, connection states between input lines and input channels, connection states between output lines and output channels, parameter values set in the channels, etc.) used to control a variety of processes (for example, a mixing process 304 described later) of the signal processor 108 in the mixer. The mixer includes a scene memory in the flash memory 102. Parameter data in the current memory with a scene number assigned thereto may be stored in the scene memory. Inversely, a scene number may be specified to recall a scene from the scene memory to the current memory. In a specific manipulation method, the up and down buttons 223 and 224 are used to change the scene number displayed on the scene number display portion 221 and the recall button 225 is turned on to recall a scene of the scene number. In addition, a scene number is specified and the store button 222 is turned on to store the parameter values currently set in the current memory as a scene of the scene number. The scene number display portion 221 generally displays a scene number of the scene currently recalled to the current memory.

A user of the mixer needs to previously register a user name, a password, and the like. A user authority is set for each user name. A logged-in user can perform manipulations within a user authority set for the user. Special user names include an "administrator" and a "guest". The special user names "administrator" and "guest" are preset when the mixer is prepared for shipping and cannot be deleted. A password cannot be set for the user name "guest". When the mixer is powered on, the mixer is activated while the user automatically logs into it with the user name "guest" without any manipulation. If the user desires to log into the mixer with another user name, the user turns on a login button 251 on the external panel, whereby a login process is activated and a user selection screen is displayed on the display. The user then performs manipulations to select a user name on the screen and then to input a password, thereby logging into the mixer.

If the user turns on a logout button 252 on the external panel, a logout process is activated and a logout check screen is displayed. If the user performs a manipulation to instruct logout on the displayed screen, then the user logs out of the mixer. If the user logs out, a login process is automatically performed with the user name "guest". Accordingly, a user is always logged into the mixer, provided that the mixer is powered on. If any other user than "guest" logs out of the mixer, then the logged-in user returns to "guest". The "guest" cannot log out of the mixer.

A user setting operator group 253 is a portion including a plurality of operators that allows a logged-in user to arbitrarily set functions.

FIG. 3 illustrates how processes of the mixer according to this embodiment are controlled based on setting information in the current memory. As described above, the current memory 303 is provided in the RAM 103. A mixing process 304 of the DSP 108 is performed based on a variety of parameter values set in the current memory 303. An operator/fader 301 corresponds to the operators or faders shown in FIG. 2. A manipulation of the operator/fader 301 is detected through a manipulation detection process 302 performed by the CPU 101, and a parameter value of the current memory 303 is set and changed (edited) according to the detected manipulation. Setting and change of the parameter value is reflected in the mixing process 304 of the DSP 108.

The current memory 303 has a system setting information storage region, a variety-of-parameters storage region, and a user setting information storage region. The system setting information storage region is a region in which system setting information is set. The system setting information is basic setting information used when the mixer system operates. Data set in the variety-of-parameters storage region mainly includes parameter values such as coefficients used when the DSP 108 performs a mixing process. Data set in the user setting information storage region includes setting information unique to the logged-in user. The user setting information and the system setting information is not included in the scene data, and user setting information and system setting information in the current memory is not overwritten with recalled scene data.

A user key file 310 is provided for each user and stores user management data unique to each user, i.e., setting information of the user such as a user name, a password and user authority data required when the user logs into the mixer. A user key file 310 for "administrator" and a user key file 310 for "guest" are stored in an internal storage device such as the flash memory 102 integrated in the digital mixer. User key files 310 for other users are stored in an external storage device such as USB memories 110 removably attached to the digital mixer in case that accounts of their user names are created. Since user key files 310 for users other than "administrator" and "guest" are stored in their USB memories 110, only the users can log into the mixer with their user names, thereby preventing others from improperly logging into the mixer with their user names. User key files 310 of a plurality of users may also be stored in one USB memory 110.

The user key file 310 includes a U account data 312, a U defined SW data 313, a U preference data 314, and a U header 311, which is an identifier indicating that this file is a user key file. Here, it is assumed that at least the U account data 312 is encrypted and users are not allowed to refer to the encrypted data without a proper process of the system.

The U account data 312 includes (1) a user name, (2) a user password, which is null when the user name is "guest", (3) a setting file name, (4) an authentication ID, and (5) authority data. The setting file name (3) is the file name of a setting file read when the user has logged in with the user name. The setting file stores information that defines all setting states of the mixer other than the U account data, the U defined SW data, and the U preference data included in the user key file, which will be described in detail later with reference to a setting file 330 in the drawing. The authority data (5) represents the authority of the user, i.e., represents which functions the user is allowed (or not allowed) to use.

The authentication ID (4) is a password of "administrator" who is a manager of the mixer that is used by the user of this user name. The authentication ID (4) is the same data as a user password (2) in the user key file 310 of "administrator". When this user logs into the mixer, it is checked whether or not the authentication ID is identical to the password of "administrator" of the mixer (more specifically, the password (2) stored in the user key file 310 of "administrator" of the mixer). When both are not identical, the mixer prompts the user to input the password of "administrator". If the password of "administrator" is input, the user is allowed to log into the mixer, otherwise the login is refused.

The U defined SW data 313 is data that defines functions of the operators of the user setting operator group 253 described above in FIG. 2. The U preference data 314 is option setting data of preferences of the user (for example, data regarding an option as to whether to output a check screen asking whether to write a changed parameter when the parameter has been changed).

When the user has properly logged into the mixer through the login process, a user key file 310 of the user is loaded and set in the user setting information storage region of the current memory 303. The setting file 330 (described later) of the setting file name (3) of the U account data 312 is loaded within the authority of the logged-in user. Thereafter, processes are performed within the authority granted to the user based on authority data set in the user setting information storage region. In addition, functions of the operators of the user setting operator group 253 or option setting values of the preferences of the user are determined based on the loaded U defined SW data 313 and U preference data 314. Details of the authority will be descried later with reference to FIG. 12.

The scene memory 320 will now be described. The scene memory 320 is a memory region secured in the flash memory 102 to store the scene data illustrated in FIG. 2. In FIG. 3, "1" to "N" are scene numbers. Scene data can be recalled or stored through manipulations illustrated in FIG. 2. When it is requested that scene data be recalled, the scene data is read and then stored in the variety-of-parameters storage region of the current memory and a mixing process is performed based on parameter values of the scene data. When a scene number n is specified and scene data is instructed to be stored, the data of the variety-of-parameter storage region of the current memory 303 is written to scene data n of the scene memory 320.

Although the above description has been given of the scene memory 320, the same is true for a library. The term "library" refers to a collection of data of sets of parameter values, which is used to collectively set a plurality of parameter items that may be part of the scene data. For example, libraries such as an equalizer (EQ) library, a compressor library, and an effecter library are prepared. For example, if it is assumed that the scene memory 320 is an effecter library, parameters of an effecter of the mixer realized by the DSP 108 can be collectively set by recalling data n to the current memory 303. Inversely, a position in data of a library can be specified and setting values of the effecter set in the current memory 303 can be stored as data n of the library. FIG. 3 shows that libraries A and B are provided in the RAM 103.

The setting file 330 will now be described. The setting file 330 contains user operation data that the mixer reads when each user logs into the mixer. Specifically, a setting file 330 corresponding to a setting file name written in a user key file 310 of the logged-in user is read as described above. Setting information, which defines how all states of the mixer are set, is stored in the setting file 330. The setting file 330 is stored in the same storage medium as that in which a user key file 310 of a user who reads the setting file 330 is stored. Specifically, setting files read by "administrator" and "guest" are stored in the flash memory 102 since their user key files 310 are stored in the flash memory 102. Setting files read by other users are stored in their USB memories 110 since their user key files 310 are stored in the USB memories 110.

The setting file 330 includes a S header 331, a system setting region 332, a current memory region 333, a scene memory region 334, a library A region 335, a library B region 336, and another region 337. The system setting region is a region which retains system setting information that is stored in the system setting information storage region in the current memory 303. The current memory region 333 is a region which retains information of a variety of parameter values stored in the variety-of-parameters storage region in the current memory 303. Although the current memory region 333 retains the user setting information storage region, the user key file 310 rather than the setting file 330 retains the user setting information stored in the user setting information storage region. The scene memory region 334 is a region which retains scene data that is stored in the scene memory 320 in the flash memory 102 of the mixer. The library A region 335 and the library B region 336 are regions which retain library data that is stored in the libraries A and B (320) in the flash memory 102. The region 337 retains other data. Specifically, if the setting file 330 is loaded into the mixer, then data of the system setting region 332 and the current memory region 33 is loaded into the region of the current memory 303 in the RAM 103, data of the scene memory region 334 is loaded into the region of the scene memory 320 in the flash memory 102, and data of the library A region 335 and the library B region 336 is loaded into the regions of the libraries A and B (320) in the flash memory 102, the operation of the mixer is controlled according to the loaded data.

Dotted lines 305-307 in FIG. 3 indicate that processes for storing/recalling or saving/loading data can be performed only when the current user has the authority to perform the processes. However, loading of the user key file 310 into (the user setting information storage region of) the current memory 303 is set to be always allowed since the user key file 310 must be read when the user logs in.

Users of the mixer and their authority will now be described. Detailed items of the authority will be described later with reference to FIG. 12. As described above, the "administrator" and "guest" are registered as specified users in the mixer. The administrator is a user who has the highest authority. Only the administrator can set and change the authority of the guest. Even the "administrator" cannot change the authority of "administrator" since the authority thereof is fixed to the highest. Anyone including the "guest" cannot set and change the authority of "guest". The administrator can register new accounts of "General User" and "Power User". The "General User" and "Power User" are group names. When each individual user name is registered, it can be specified whether the user name is a "general user" or a "power user". The administrator can set and change the authority of each individual user who is a general user or a power user. The power user can set and change the authority of the power user and the authority of general users. However, the power user can set and change their authority within the limits of the authority given to the power user. Each general user can refer to their authority but cannot change their authority. Each general user cannot even refer to the authority of other users. The only difference between the general user and the power user is that the general user cannot change their authority and the power user can set and change their authority. The other authority elements are based on the other authority setting items in the authority data.

Since enabled or disabled functions are controlled according to the authority of each user as described above, it is possible to suppress wrong manipulations of an unskilled user and to limit the range of manipulations of external engineers (guest engineers) and also to prevent other users than a specific person in charge from freely manipulating specific parameters with a case which a number of persons alternately use. It is also possible to easily switch preference settings of users. In addition, the logged-in user can start manipulating the mixer without caring about the immediately previous setting of the mixer since a specific setting file is automatically read upon the login.

A description will now be given of how a user logs into a mixer of this embodiment. As described above, when the mixer is powered on, the mixer is activated while the user automatically logs into it with the user name "guest". If the user desires to log into the mixer with another user name, the user turns on the login button 251 and selects the user name on the user selection screen, thereby logging into the mixer. If the user turns on the logout button 252, the user name logs out of the mixer while a login process is automatically performed with "guest". Accordingly, a user is always logged into the mixer, and if any other user than "guest" logs out of the mixer, then the logged-in user returns to "guest".

The login/logout process can be performed by inserting and removing the USB memory 110 into and from the mixer instead of using the login button 251 and the logout button 252. Specifically, if a USB memory 110 in which a user key file is stored is inserted into the mixer, a list of users in the user key file is displayed on the screen and the user can select a login user from the user list, thereby logging into the mixer. If the USB memory 110 is removed from the mixer, then the user name automatically logs out of the mixer. Although the power user can create or edit a user key file 310 with the USB memory 110, they may desire to remove the USB memory 110 with their user key file 310 stored therein, which has been inserted in an insertion port of the mixer at that time, and instead to insert a target USB memory 110 in which a user key file 310 is to be created or edited. However, if a USB memory 110 is newly inserted into the mixer replacing the inserted one, the current user logs out and a user of the newly inserted USB memory 110 logs in since the mixer has a function to perform login/logout upon inserting or removing a USB memory 110. Thus, while the power user creates or edits the user key file 310, the power user does not log out even when the USB memory 110 is removed and the power user remains as the current user without performing a new login process even when a target USB memory 110 in which a user key file 310 is to be created or edited is inserted.

A description will now be given of features of the mixer when a user logs in. As described above, when a user logs in, the mixer checks whether or not an authentication ID in a user key file 310 of the user corresponds to a password of the administrator of the mixer. With a USB memory 110 including their user key file 310 stored therein, a user can log into and use a mixer that is under the management of an administrator specified by an authentication ID in the user key file 310 (i.e., a mixer in which a password of the administrator is stored). In other words, the user cannot log into a mixer that is under the management of a different administrator from the administrator specified by the authentication ID. Such management makes it possible to group one or more mixers in which the same administrator password is set and one or more users that have the password as their authentication ID into one group. This achieves management which allows users belonging to a group to use only mixers belonging to the group (i.e., prevents the users from using mixers belonging to other groups). In the case where the manager (i.e., the administrator) of a mixer is changed, simply by changing the password of a user key file 310 of an "administrator" retained in the mixer, it is possible to convert it to a mixer that can be used only by users belonging to a new "administrator" group.

When a user logs into a mixer, a setting file of a setting file name of a user key file 310 of the user is automatically read and set in the mixer, so that environments of the mixer suitable for the user can be immediately realized. Reading the setting file is performed according to the authority of the logged-in user. Specifically, even data written in the setting file cannot be read if the logged-in user is not given the authority to load or recall the data. Thus, users given different authorities can share the same setting file and respective environments according to the authorities can be realized even if the setting file is shared.

Figure 4A:
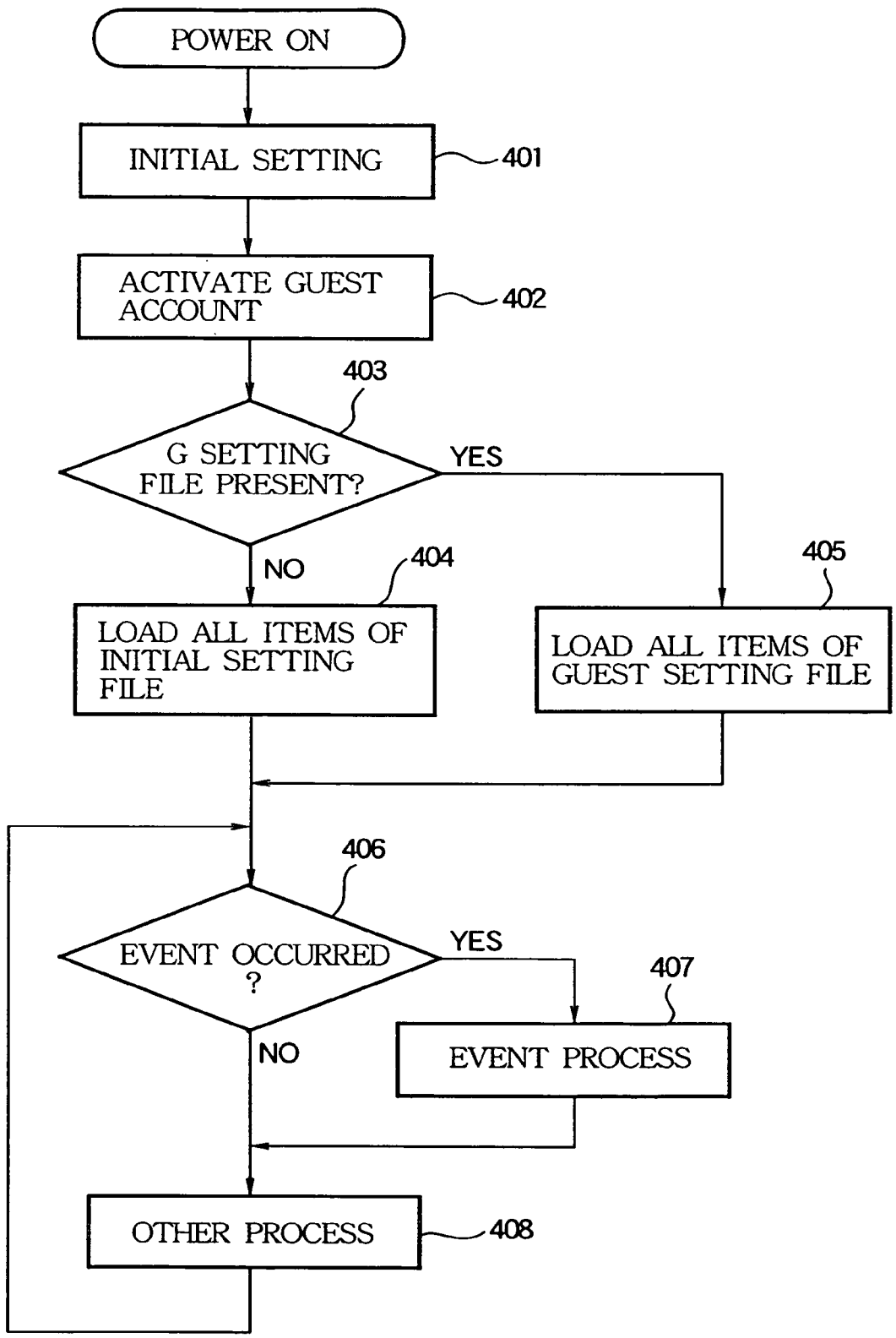
FIGS. 4a and 4b are a flow chart of a procedure that is performed when the mixer is powered on and a flow chart of a procedure that is performed when an ON event of a login button occurs or when an insertion event of a USB memory occurs.

FIG. 4a is a flow chart of a procedure that the CPU 101 performs when the mixer is powered on. The CPU 101 performs initial setting at step 401 and activates the account of the "guest" at step 402. This is a process in which a user key file 310 of the "guest" is read and a variety of data of the user key file 310 is loaded into the current memory 303 as described above. Then, at step 403, the CPU 101 checks whether or not a setting file name has been written in the U account data 312 of the read user key file 310 and the setting file is present in the flash memory 102. If the setting file name has not been written or if the setting file is not present, all items of a predetermined initial setting file 330 are loaded into the current memory 303 or the like at step 404 as described above with reference to FIG. 3. Here, it is assumed that the predetermined initial setting file 330 has already been stored in the flash memory 102 with a specific file name. If the setting file name has been written in the read user key file 310 of the guest and the setting file is present in the flash memory 102, all items of the setting file are loaded into the current memory 303 or the like at step 405.

Then, at step 406, the CPU 101 waits until one of a variety of events occurs and performs a process according to an occurring event at step 407. When no event has occurred or after step 407, the CPU 101 performs another process at step 408 and returns to step 406. Examples of events that cause processes to be performed include a USB memory insertion or removal event, a fader (105) manipulation event, an operator (106) manipulation event, an event associated with communication with a variety of external devices, and a user switching event.

According to the procedure described above, when the mixer is powered on, an automatic login process is performed with the "guest" without performing any login manipulation.

Figure 4B:
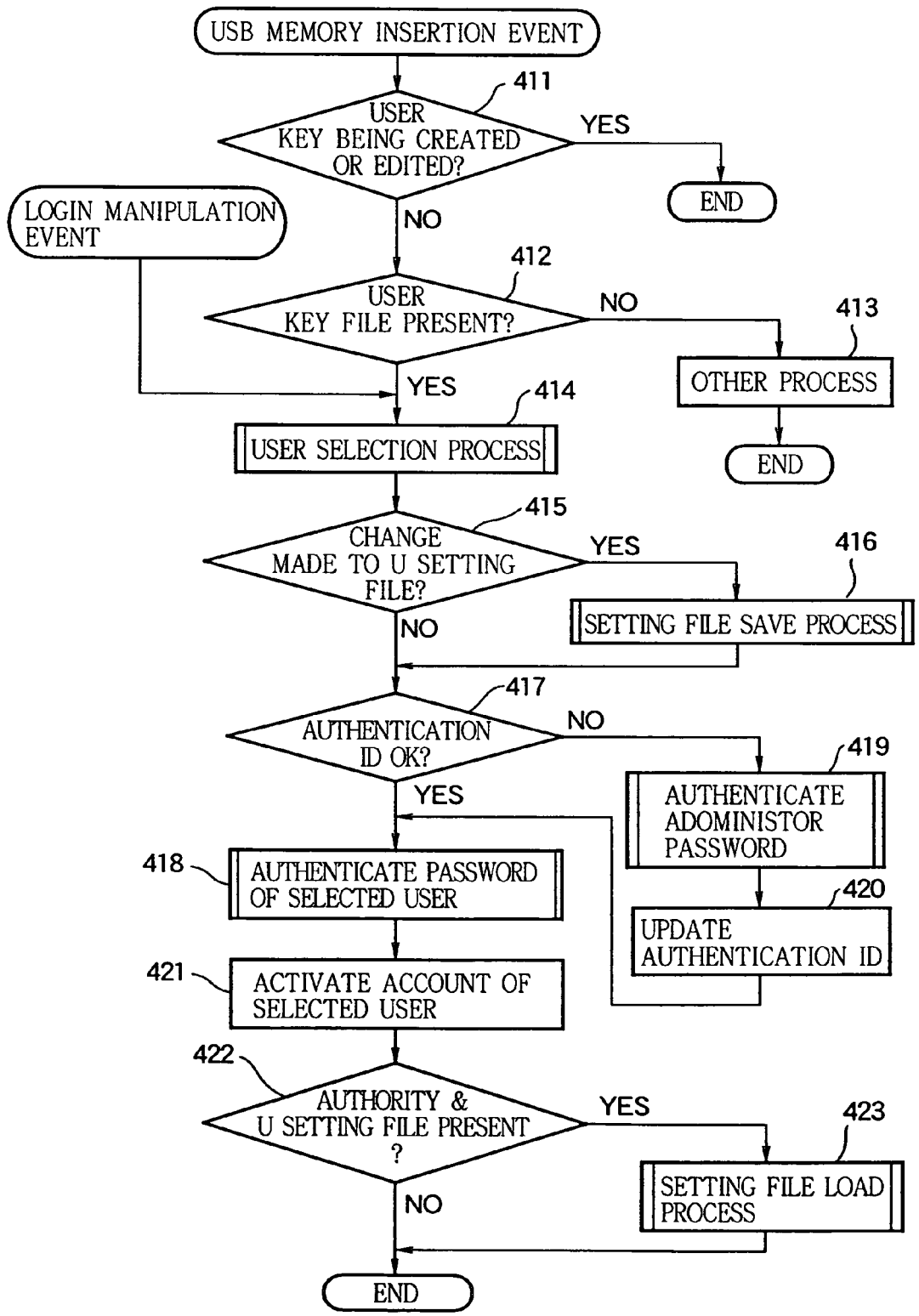
Figure 8A:
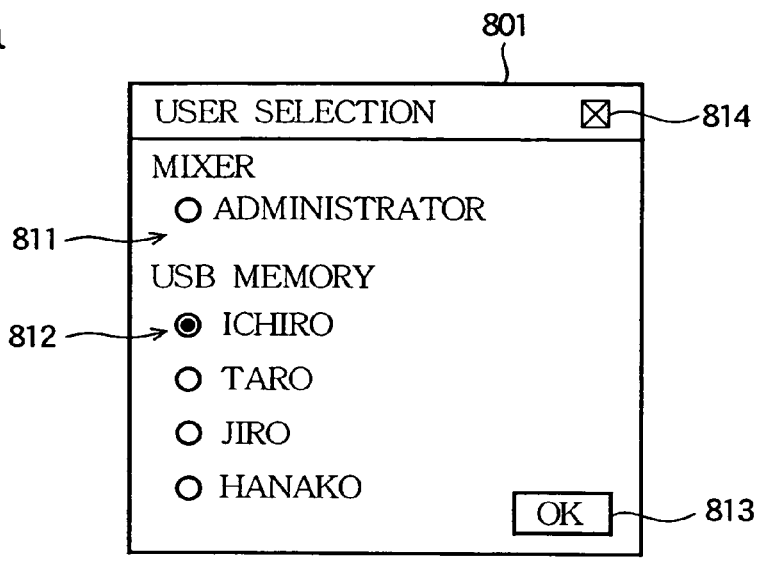
FIGS. 8a-8c show examples of a user selection screen.

FIG. 4b is a flow chart of a procedure that the CPU 101 performs when an ON event of the login button 251 of FIG. 2 occurs or when an insertion event of the USB memory 110 occurs. When an ON event of the login button 251 occurs, the CPU 101 performs the procedure, starting from step 414. At step 414, the CPU 101 performs a user selection process. FIG. 8a shows a user selection screen 801 displayed at step 414. An administrator, for which a user key file 310 is stored in the flash memory 102 of the mixer body, is displayed with a radio button as denoted by "811" in FIG. 8a. The "guest" is not displayed. This is because turning on the login button 251 allows a user other than the "guest" to log into the mixer. From the viewpoint of an operator who manipulates the mixer, no login process is performed with the "guest". A list of user names of user key files 310 in the USB memory 110 connected to the mixer at that time is also displayed with their radio buttons as denoted by "812". "813" denotes an OK button and "814" denotes a close button. The user selects a user to log in from the displayed users using a corresponding radio button and terminates a user selection process by turning the OK button 813 on. When the close button 814 has been turned on, the user selection is regarded as having been cancelled and the login state of the currently logged-in user is maintained without performing any subsequent process.

After step 414, the CPU 101 determines, at step 415, whether or not any change has been made to the setting states of the setting file read when the currently logged-in user logs in. When any change has been made, the CPU 101 performs a process for saving the setting file at step 416. This process will be described in detail later with reference to FIG. 5b. When no change has been made to the setting file at step 415 or after step 416, the CPU 101 determines, at step 417, whether or not an authentication ID in the user key file 310 of the newly selected user is identical to the password of the "administrator" of the mixer. If both are identical, the CPU 101 determines that the selected user is an appropriate user of the mixer and authenticates the password of the selected user at step 418.

Figure 9A:
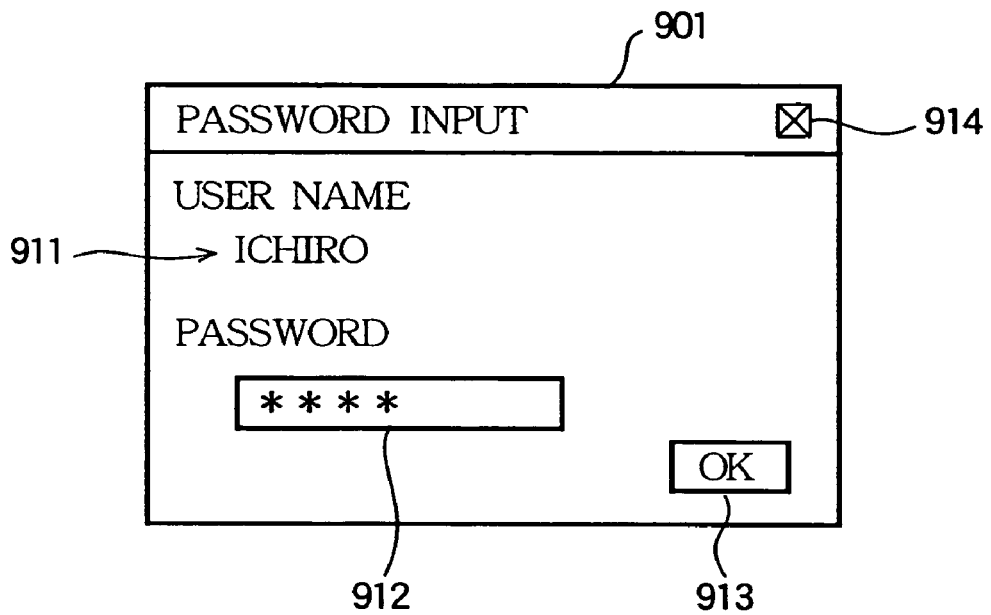
FIGS. 9a and 9b show examples of a selected user password authentication screen and an administrator password authentication screen.

FIG. 9a shows a password authentication screen 901 of the selected user. The selected user name is displayed as denoted by "911" and a password input region 912, an OK button 913, and a close button 914 are displayed. If the user inputs a password to the password input region 912 and turns on the OK button 913, then the CPU 101 performs password authentication. Details of the process of step 418 will be described with reference to FIG. 5a.

If the authentication ID of the user is different from the password of the administrator of the mixer at step 417, the CPU 101 performs a password authentication process of the administrator at step 419 and performs an authentication ID update process at step 420 and then proceeds to step 418.

Figure 9B:
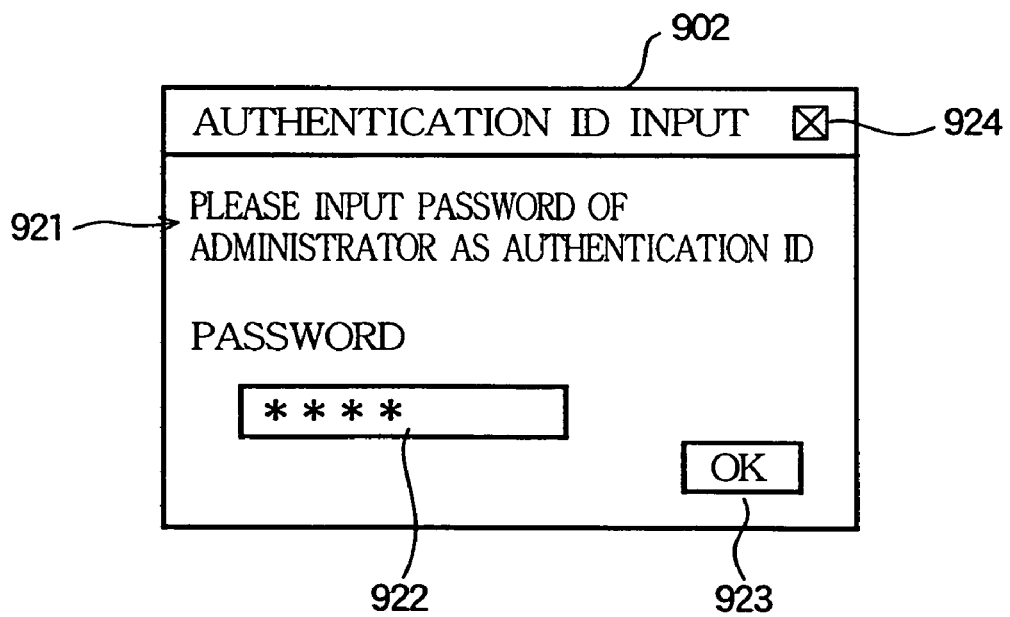

FIG. 9b shows a password authentication screen 901 of the administrator displayed at step 419. Since the authentication ID is different from the password of the administrator, the CPU 101 displays a message 921 requesting that the password of the administrator of the mixer be inputted in order to confirm whether or not the user is a proper user of the mixer. The user then enters a password of the administrator of the mixer and turns on the OK button 923. If a correct password is entered, the CPU 101 performs, at step 420, a process for updating the authentication ID region in the user key file 310 of the user with the new password of the administrator entered into the region 922. Accordingly, a user key created for another mixer is used as the user key of the mixer as needed.

Thereafter, the CPU 101 proceeds to step 418 to perform password authentication of the selected user. Although the authentication ID of the user is rewritten at step 420, it is also possible to allow the user to select whether to rewrite the authentication ID. Also when the authentication ID is rewritten, the authentication ID checking result is OK since a proper password of the administrator has been entered and the CPU 101 proceeds to step 418.

Subsequent to step 418, the CPU 101 activates the account of the selected user at step 421. This is a process for loading information of the user key file 310 of the selected user into the user setting information storage region of the current memory 303. Then, if the CPU 101 determines, at step 422, that the selected user has the authority to load a setting file according to authority data of the selected user and also that a setting file name is written in the user key file 310 of the user and the setting file is present in the same recording storage (the flash or USB memory) as that in which the user key file 310 is stored, the CPU 101 loads the setting file of the setting file name at step 423 and terminates the procedure. If the CPU 101 determines, at step 422, that the selected user has no authority to load a setting file and that the setting file name has not been written or that the setting file is not present in the same recording storage, the CPU 101 terminates the procedure without any further process. The setting file load process will be described with reference to FIG. 5b.

Figure 8B:
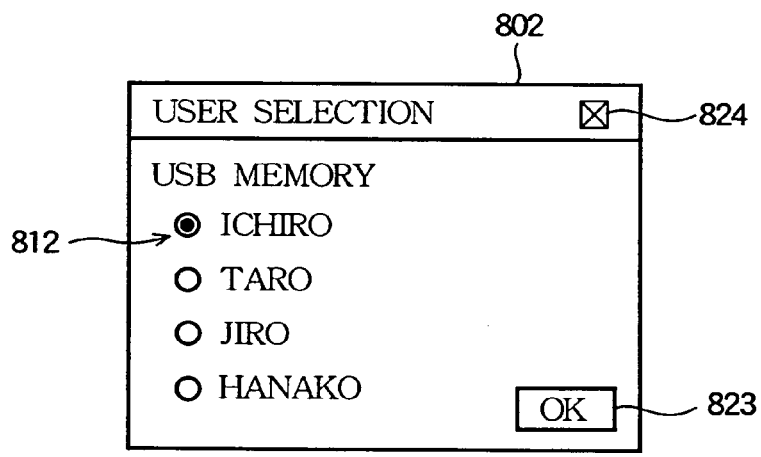

When an insertion event of the USB memory 110 occurs, the CPU 101 performs the same procedure as described above. First, at step 411, the CPU 101 determines whether or not a user key is being created or edited. If the determination is yes, the CPU 101 terminates the procedure without any further process. When the logged-in user is the administrator or the power user, they can create or edit a user key, and, in some case, they may insert a USB memory in which a user key to be edited is stored or a USB memory in which a new user key to be created is to be stored, replacing the inserted one. In this case, the CPU 101 does not determine that the insertion of the USB memory 110 indicates re-login and terminates the procedure subsequent to step 411. If the user key is not being created or edited at step 411, the CPU 101 determines, at step 412, whether or not a user key file 310 is present in the inserted USB memory 110. If no user key file 310 is present, the CPU 101 terminates, at step 413, the procedure without any other process. If the user key file 310 is present, the CPU 101 proceeds to step 414. The subsequent processes are the same as described above. FIG. 8b illustrates a user selection screen 802 displayed at step 414 when the USB memory 110 is inserted. Inserting the USB memory 110 can be regarded as having the intention to log in with a user of the USB memory 110. Thus, at step 802, the CPU 101 displays a list of users in the USB memory 110 as denoted by "822".

Figure 5A:
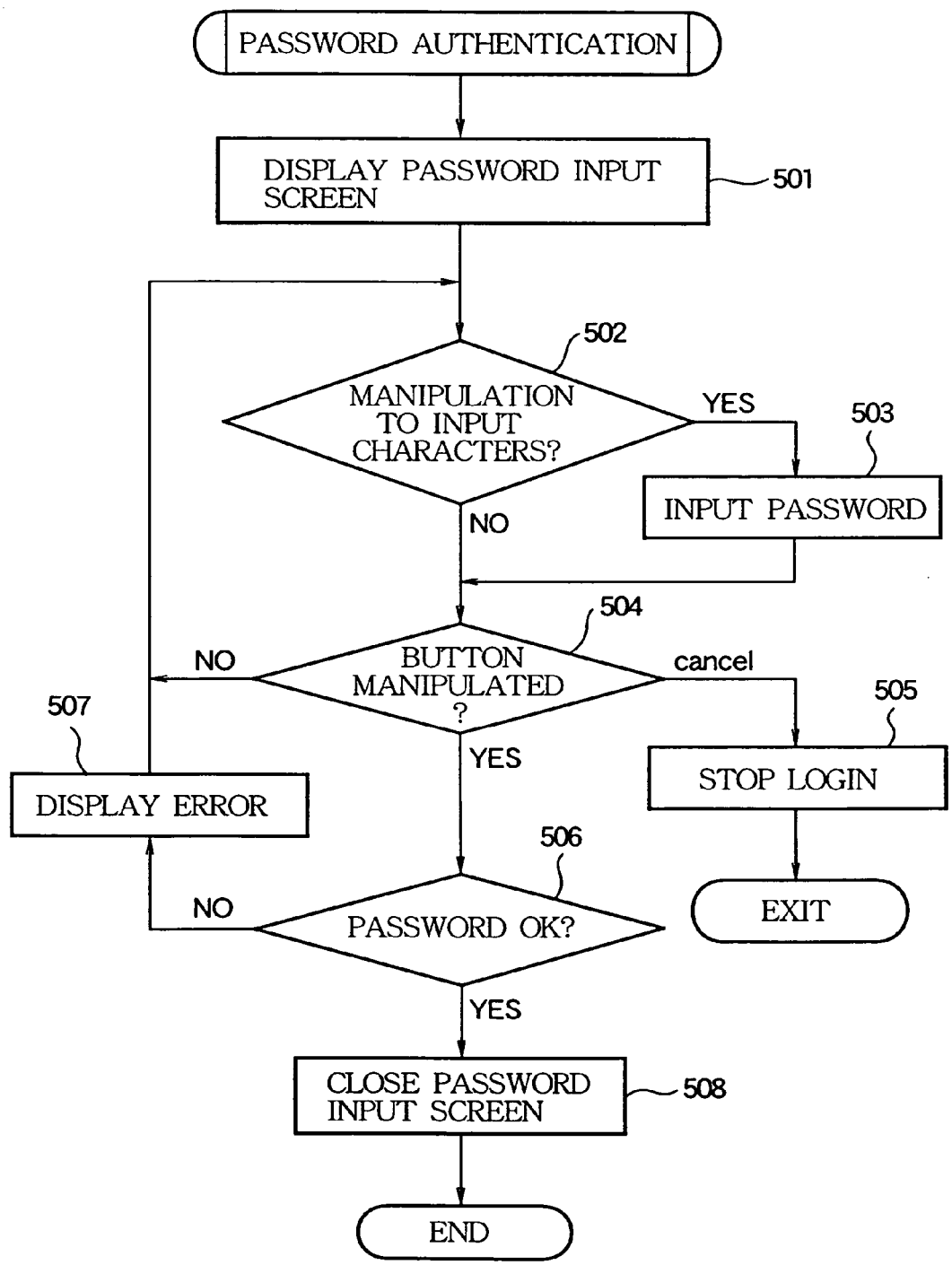
FIGS. 5a and 5b are a flow chart of a selected user password authentication process and a flow chart of a setting file save process.

FIG. 5a is a flow chart of the password authentication process of the selected user of step 418. At step 501, the CPU 101 displays a password authentication screen 901 illustrated in FIG. 9a. If a manipulation for inputting characters is detected at step 502, the CPU 101 sets the input characters in the password input region 912 at step 503. Then, the CPU 101 detects a button manipulation at step 504. If no button manipulation is detected, the CPU 101 returns to step 502. If the close button 914 is turned on, the CPU 101 determines that the password authentication process has been cancelled and stops the login process at step 505. In this case, the CPU 101 cancels all the processes of step 418 and the subsequent steps of the calling procedure and returns to the original state. In this case, the account of the user may be automatically returned to the account of the guest.

If the OK button 913 is turned on at step 504, the CPU 101 determines, at step 506, whether or not a password that has been input until then is identical to the user password in the user key file 310 of the user. If both passwords are not identical, the CPU 101 displays an error message at step 507 and returns to step 502. If both passwords are identical, the CPU 101 closes the password authentication screen 901 at step 508 and terminates the procedure.

The password authentication process of the administrator of step 419 of FIG. 4b is similar to the process of FIG. 5a. However, a password authentication screen 902 of the administrator shown in FIG. 9b is displayed at step 501.

Figure 5B:
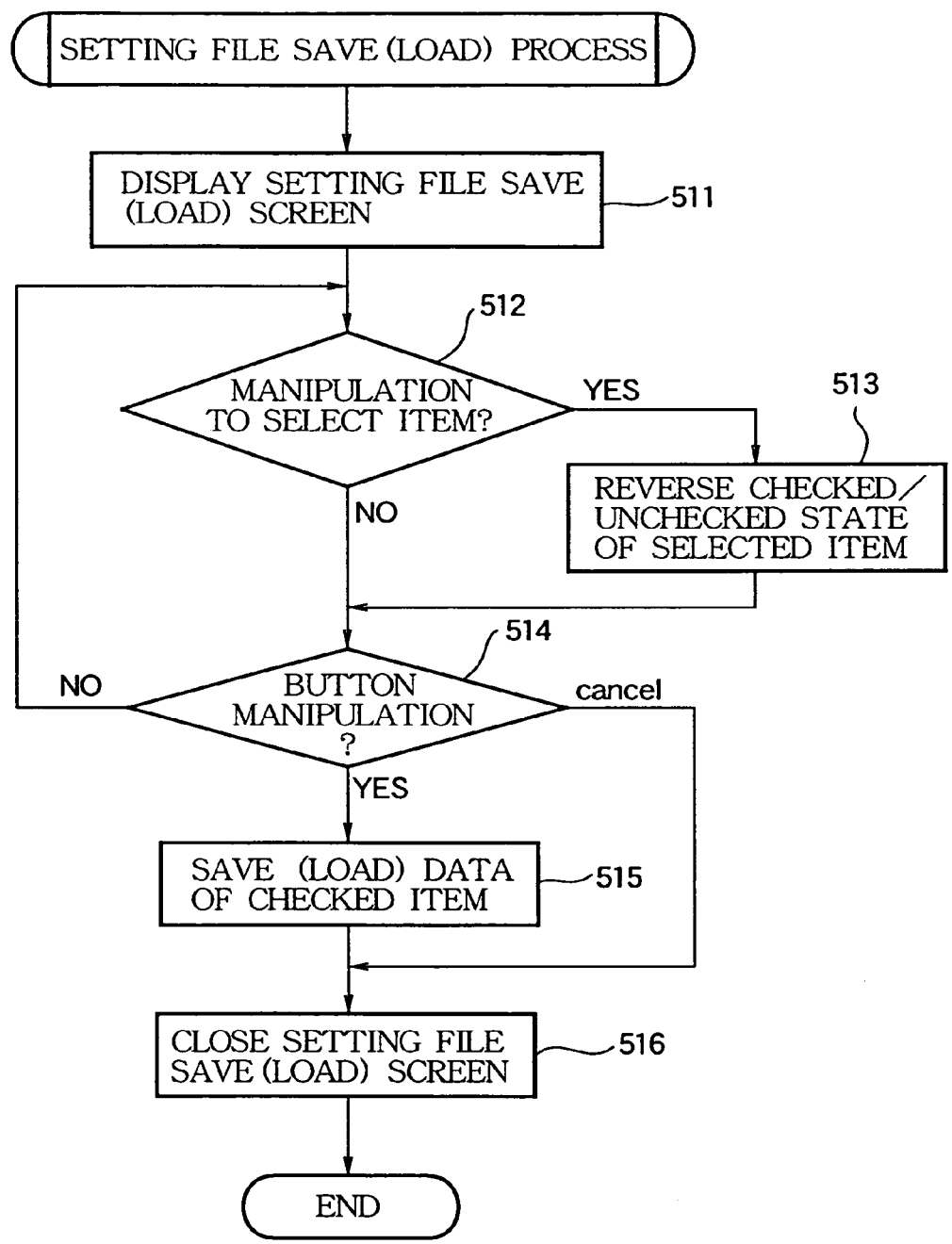
Figure 10A:
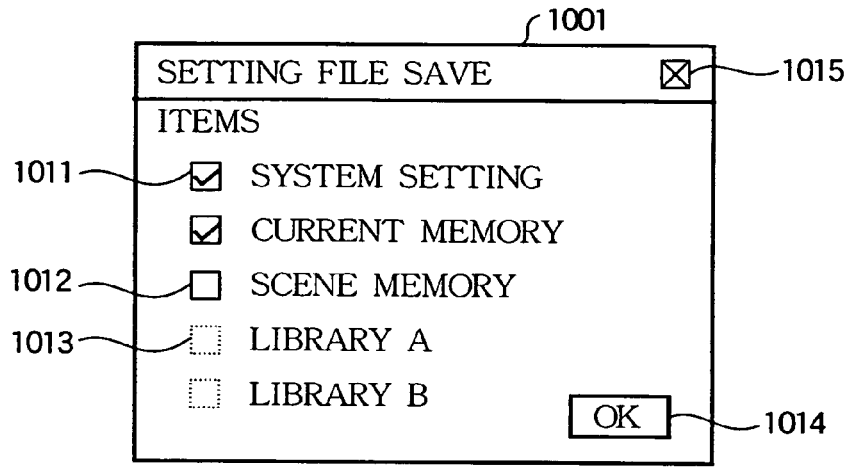
FIGS. 10a and 10b show examples of a setting file save screen and a setting file load screen.

FIG. 5b is a flow chart of the setting file save process of the setting file of step 416 in FIG. 4b. First, at step 511, the CPU 101 displays a setting file save screen 1001 of FIG. 10a. Check boxes used to specify items of the setting file 330 (see FIG. 3) to be saved are displayed on the screen 1001. For example, a "system setting" check box 1011 is checked and a "scene memory" check box 1012 is not checked, so that system setting information of the system setting information storage region of the current memory is saved in the system setting information 332 of the setting file 330 whereas information of the scene memory 320 is not saved in the scene memory 334 of the setting file 330. Items which the logged-in user has no authority to save are grayed out. For example, a "library A" check box 1013 is grayed out, which indicates that the currently logged-in user has no authority to save the library A. In the drawing, "1014" denotes an OK button and "1015" denotes a close button.

Subsequent to step 511, the CPU 101 determines, at step 512, whether or not a manipulation to check/uncheck the check box of each item is detected. If a manipulation to check/uncheck the check box of an item is detected, then the CPU 101 reverses the checked/unchecked state of the check box of the item at step 513. The CPU 101 then detects a button manipulation at step 514. If no button manipulation is detected, the CPU 101 returns to step 512. If the close button 1015 is turned on, the CPU 101 skips step 515 and proceeds to step 516. If the OK button 1014 is turned on, the CPU 101 saves data of the checked item in the setting file 330 and proceeds to step 516. The setting file 330 in which the checked item data is to be saved is specified by a setting file name in the use key file 310 of the logged-in user. If a setting file name is newly written replacing the setting file, read when the user logs in, in an account setting process described later, a setting file can be saved using the newly written setting file rather than the read setting file.

Figure 10B:
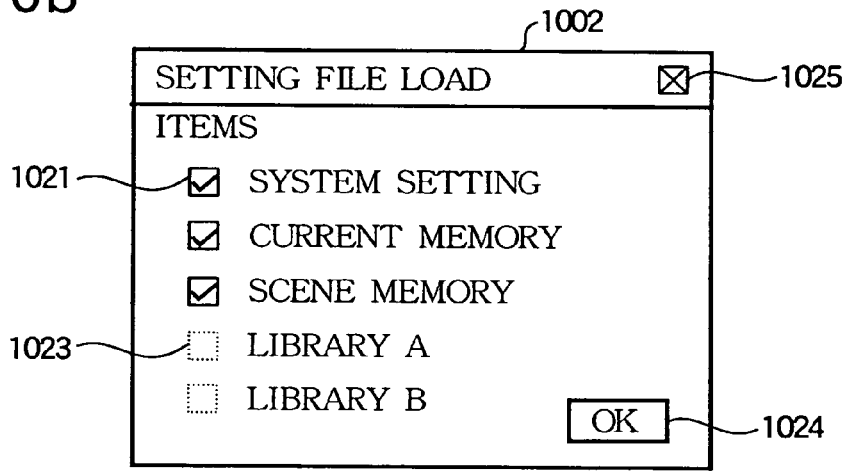

Although the procedure of FIG. 5b has been described as a save process, the setting file load process of step 423 in FIG. 4b is similar to the procedure described above. However, in the load process, a setting file load screen 1002 of FIG. 10b is displayed at step 511. Check boxes used to specify items of the setting file 330 to be loaded are displayed on the screen 1002. For example, data of a checked item 1021 is loaded from the setting file 330 into the current memory 303 or the like. Items (for example, an item 1023) which the logged-in user has no authority to load are grayed out. In the drawing, "1024" denotes an OK button and "1025" denotes a close button. The CPU 101 performs a process for loading data of a checked item at step 515 and performs a process for closing the screen 1002 of FIG. 10b at step 516.

The setting file save/load process of FIG. 5b can be performed not only when the user logs in or out but also when the user explicitly requests it.

Figure 6A:
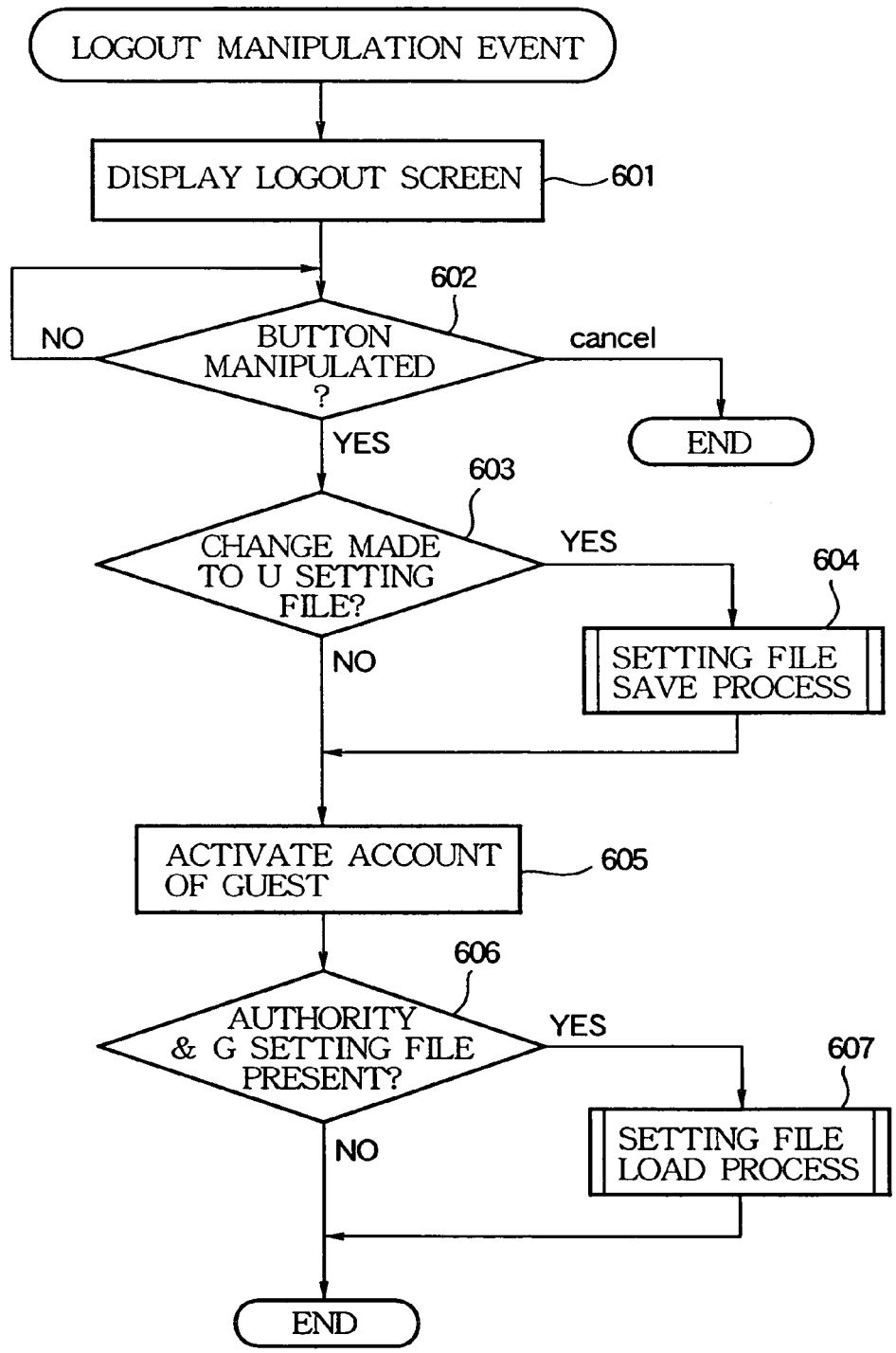
FIGS. 6a and 6b are a flow chart of a logout manipulation event process and a flow chart of a USB memory removal event process.

FIG. 6a is a flow chart of a logout manipulation event process that is performed when the logout button 252 of FIG. 2 is turned on. At step 601, the CPU 101 displays a logout screen. Although not shown, the logout screen displays a message asking whether to log out and an OK button. The CPU determines, at step 602, whether or not a button manipulation is detected. If the close button is turned on, the CPU determines that the logout process has been cancelled and terminates the logout process. If the OK button is turned on, then the CPU determines, at step 603, whether or not a setting state change has been made in the data of the setting file read when the currently logged-in user logged in. If a change has been made, the CPU performs the setting file save process (see FIG. 5b) at step 604. The CPU then activates the account of the "guest" at step 605. At step 606, the CPU determines whether or not the guest has the authority to load a setting file according to the authority data of the guest and whether or not a setting file name is written in the user key file 310 of the guest and the setting file is present in the same recording storage (the flash memory 102 in this example) as that in which the user key file 310 is stored. If the guest has the authority to load the setting file, the setting file name is written, and the setting file is present, then the CPU terminates the procedure after performing the setting file load process (see FIG. 5b) at step 607. If the guest has no authority to load the setting file, the setting file name is not written, or the setting file is not present in the flash memory 102, then the CPU terminates the procedure without any other process.

Figure 6B:
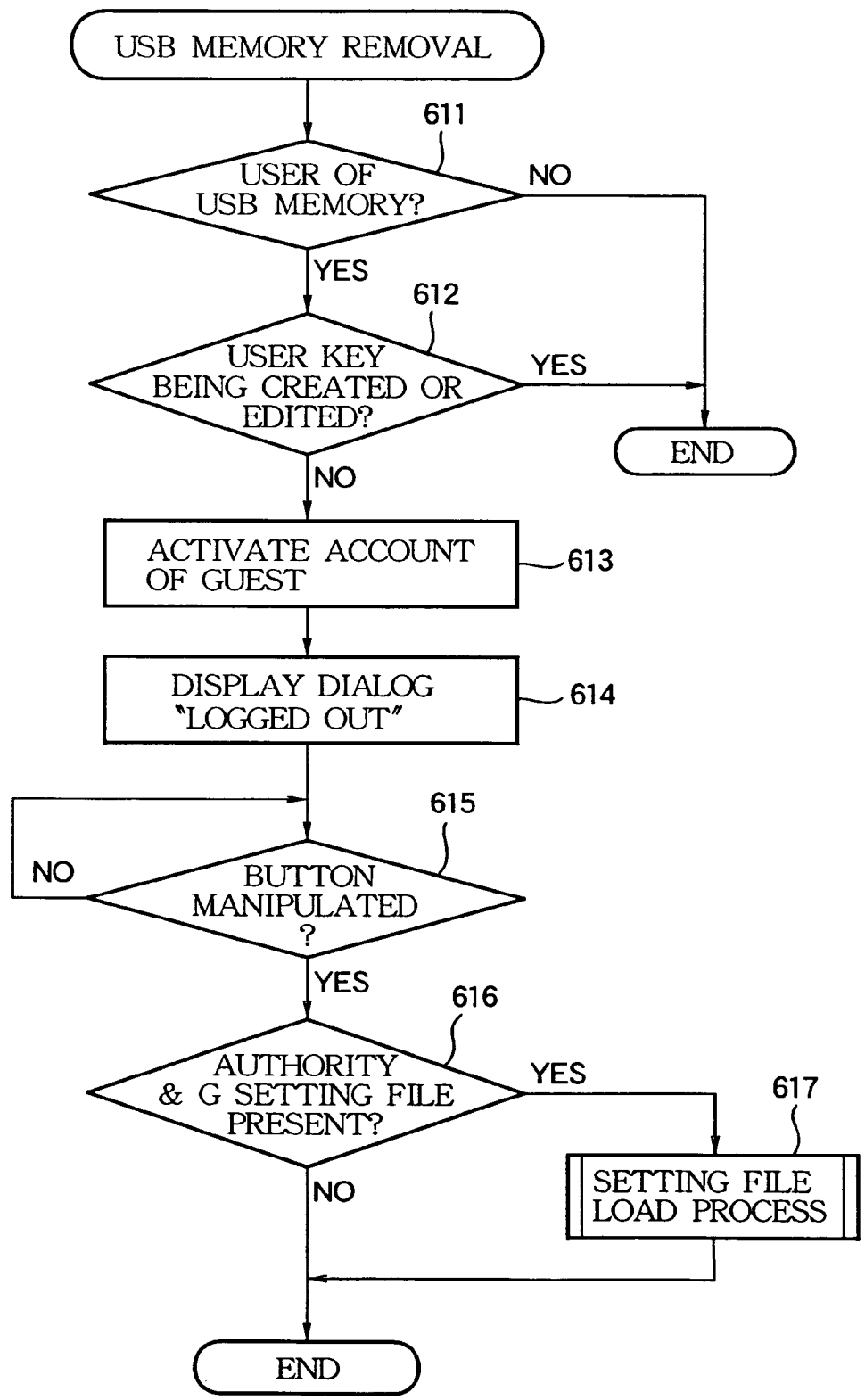

FIG. 6b is a flow chart of a process that is performed when a removal event of the USB memory 110 occurs. At step 611, the CPU 101 determines whether or not the currently logged-in user is the same as the user who had logged into the mixer from the user key file of the removed USB memory. If the determination is no, the CPU terminates the procedure. If the determination is yes, the CPU determines, at step 612, whether or not the user key is being created or edited. If this determination is yes, the CPU determines that a USB memory in which a user key file 310 in process of being created or edited is stored has been newly inserted replacing the already inserted one and then terminates the procedure without any other process. If the user key file is not being created or edited at step 612, the CPU determines that logout of the currently logged-in user has been requested and activates the account of the guest at step 613 and displays a dialog including a message "logged out" at step 614. At step 615, the CPU waits until an OK button on the dialog is turned on. If the OK button is turned on, the CPU performs, at steps 616 and 617, the same processes as those of the above steps 606 and 607 and then terminates the procedure.

Figure 7A:
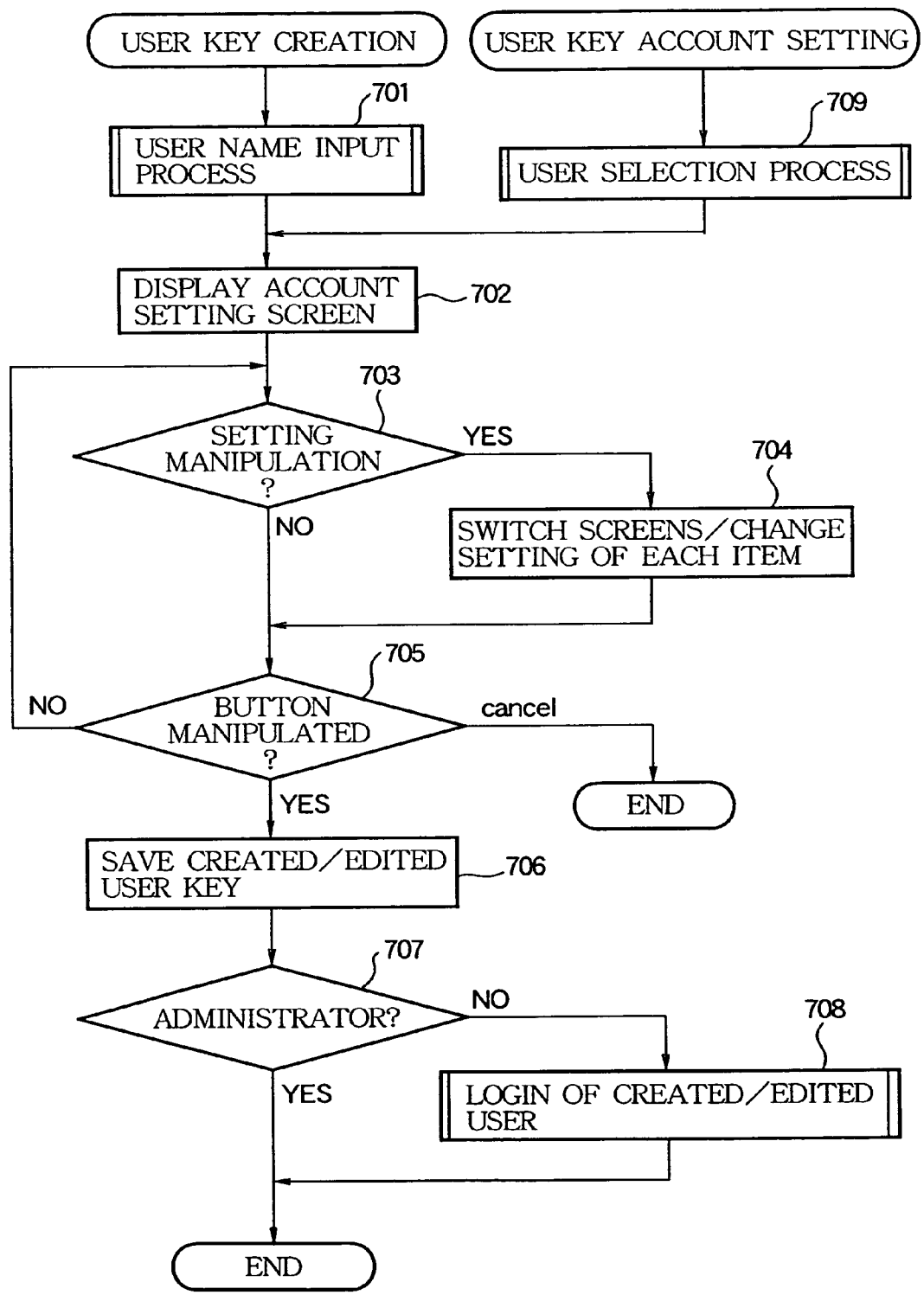

FIG. 7a is a flow chart of the user key creation process and the user key account setting process. Here, it is assumed that a current user & user key management screen 1101 shown in FIG. 11 has been displayed according to a specific manipulation.

Figure 11:
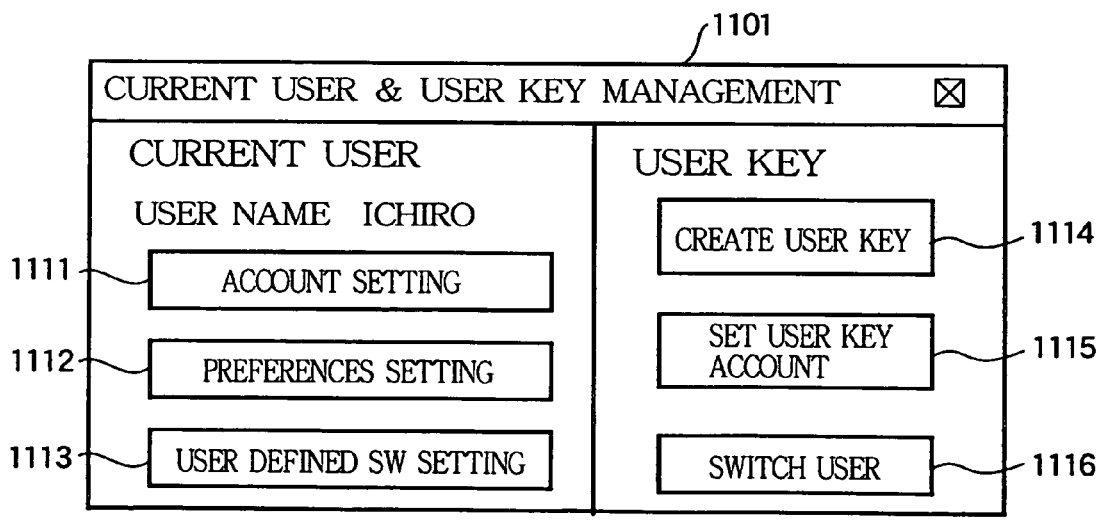
FIG. 11 shows an example of a current user & user key management screen.

First, the screen 1101 of FIG. 11 is described. An account setting button 1111 is used to issue an instruction to set or change the password or setting file name and the authority of the current user (i.e., the logged-in user). A preference setting button 1112 is used to issue an instruction to set or change the U preference data 314 of the user key file 310 of the current user. A user defined SW setting button 1113 is used to issue an instruction to set or change the U defined SW data 313 of the user key file 310 of the current user. A user key creation button 1114 is used to issue an instruction to create a user key file 310 of a new user in a currently connected USB memory. A user key account setting button 1115 is used to issue an instruction to set or change account setting data of the user key file 310 in the current connected USB memory 110 or in the flash memory 102. A user switching button 1116 is used to issue an instruction to switch the current user (i.e., to again log in).

Each button displayed on the screen 1101 is enabled or disabled depending on the authority of the current user. At least the buttons 1111 to 1113 are enabled since they are used for the current user to refer to, set, or change data associated with the current user. However, in some case, the current user may not be allowed to set or change data of screens (for example, a screen shown in FIG. 12) displayed when these buttons are turned on although the current user is allowed to refer to the data. The same is true for the user switching button 1116. When the current user is not allowed to create a new user key, the button 1114 is grayed out. Similarly, when the current user is not allowed to set and change account setting data of a user key file of another user, the button 1115 is grayed out.

A process of FIG. 7a subsequent to the "user key creation" is performed when the button 1114 on the screen 1101 of FIG. 11 is turned on. First, a new user name to be created is input at step 701. At step 702, the CPU 101 displays an account setting screen (see FIG. 12) associated with a user corresponding to the input user name. When the "power user" creates a user key, the CPU displays, at step 701, a message prompting the user to remove the currently inserted USB memory and then to insert a USB memory on which it is to be written. In response to the message, the user removes their USB memory currently inserted in the mixer and instead inserts a USB memory in which the newly created user key file is to be stored. This removal or insertion does not activate the logout or login process of the above step 411 or 612. The power user can create only general users and cannot create a new power user.

Figure 12A:
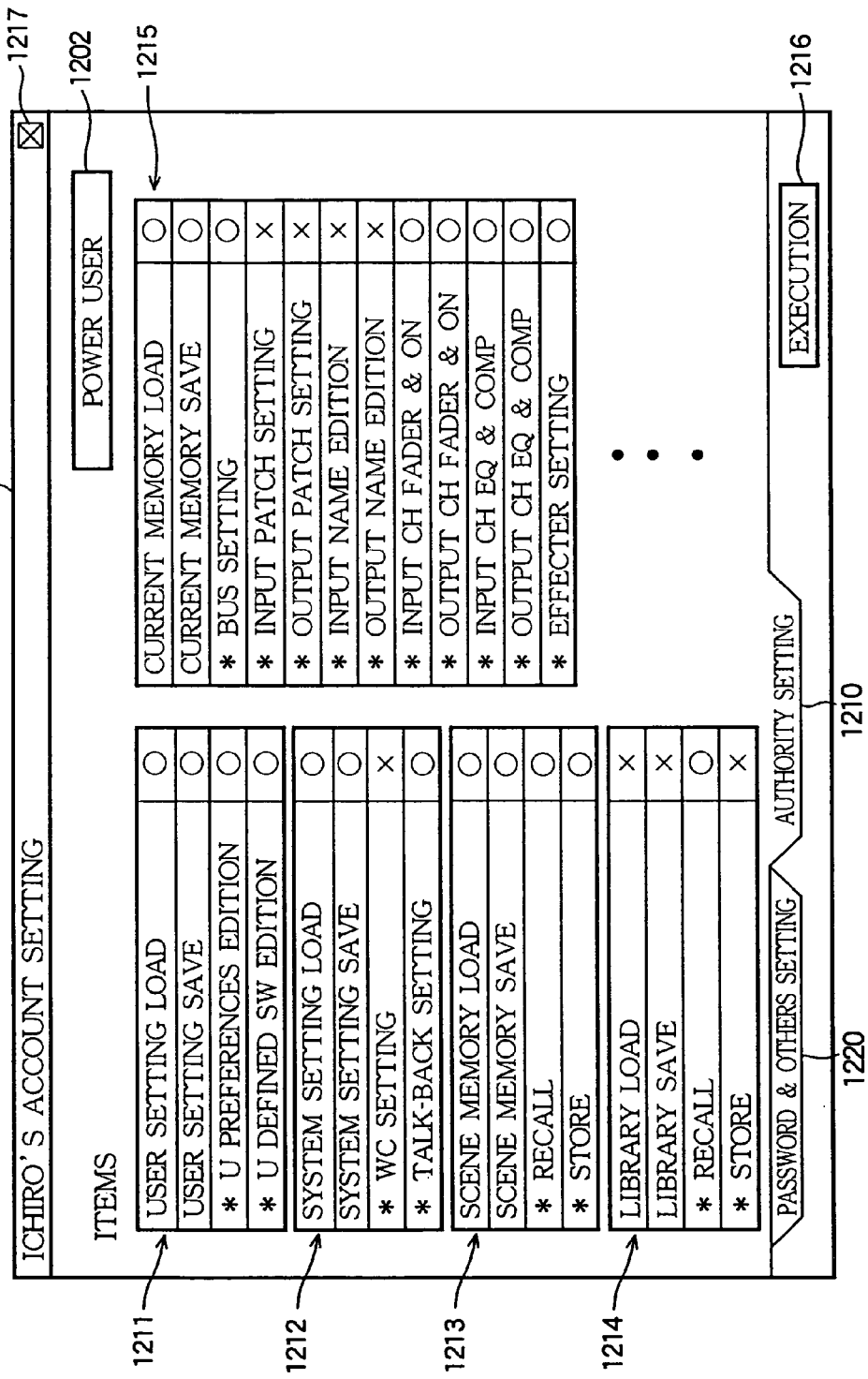
FIGS. 12a and 12b are an example of an account setting screen.
Figure 12B:
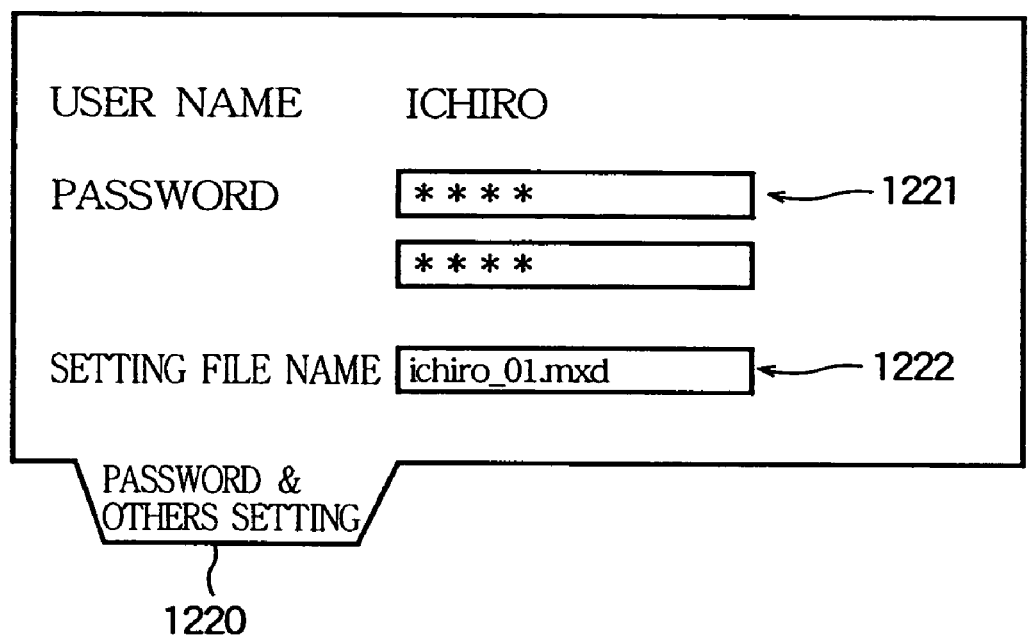

FIGS. 12a and 12b show examples of the account setting screen 1201. The account setting screen 1201 includes two tabs 1210 and 1220. The authority of a corresponding user can be set on an authority setting screen of FIG. 12a that is displayed by selecting the tab 1210. A password or a setting file name can be set and changed on a password and others setting screen of FIG. 12b that is displayed by selecting the tab 1220.

A power user setting button 1202 is displayed on the authority setting screen of FIG. 12a. If this button is turned on, the user becomes a power user and if it is turned off, the user becomes a general user. Only the "administrator" has the authority to turn on/off the power user setting button 1202 and other users cannot operate the button 1202 (i.e., the button 1202 are grayed out for other users). Reference numerals "1211" to "1215" denote items to set the authority of the user. For example, an item "user setting save" among items 1211 associated with user setting information is set to "○", so that the user is allowed to save data in the user key file 310. Authority items set to "×" are not allowed for the user. Switching between "○" and "×" is allowed or disallowed depending on the authority of the logged-in user who is performing this account setting. That is, the power user cannot perform setting of items for which they have no authority.

If the tab 1220 is selected, then the password and others setting screen of FIG. 12b is displayed. "1221" denotes two password input regions of the user, the second of which is used to once again input a password for confirmation, and "1222" denotes a setting file name input region. Users other than the guest can change their passwords. Only users who have the authority to change their setting file names can change their setting file names. The setting file is stored only in the same storage medium as that in which the user key file is stored and search for the setting file based on the setting file name is performed within the storage medium. This makes it possible to securely read the intended setting file when logging in with the user key file. Inversely, it can be considered that the name of the setting file in the flash memory 102 can be set as the setting file name in order to allow the same setting file to be used with a plurality of user key files stored in a plurality of USB memories. However, in this case, the setting file may be deleted from the flash memory or the contents thereof may be altered unless the setting file in the flash memory indicated by the setting file name is strictly managed.

If an execution button 1216 is turned on after the authority, the password, or the setting file name are set as described above, then the CPU performs the account setting of the user. If a close button 1217 is turned on, the CPU determines that the procedure has been cancelled and terminates the procedure.

Returning to FIG. 7a, the CPU checks, at step 703, whether or not a setting manipulation has occurred on the account setting screen shown in FIG. 12, which has been displayed at step 702. If a manipulation has occurred, the CPU switches the screen at step 704 (e.g., when the tab 1210 or 1220 has been manipulated) or changes the setting of each item (e.g., the authority enable/disable setting ○ and × thereof). The CPU then checks, at step 705, whether or not a button has been manipulated and returns to step 703 if a button has been manipulated. If the close button 1217 is turned on, then the CPU terminates the procedure. If the execution button 1216 is turned on, then the CPU saves information of the created/edited user key file 310 at step 706. More specifically, the user name (1) of the U account data 312 in the user key file 310 is set to the user name input at step 701 and the user password (2) and the setting file name (3) thereof are set to data input on the screen of FIG. 12b. The authentication ID (4) of the U account data 312 is set to the password of the administrator, i.e., the user password (2) of the user key file 310 of the administrator stored in the flash memory 102 of the mixer. The authority data (5) is set to data input on the screen of FIG. 12a. Since it is data that is set by the user, the U defined SW data 313 and the U preference data 314 may be set to NULL or may be set to predetermined default U defined SW data and U preference data. The authentication ID (4) may be set by displaying a specific screen and allowing a user, who is creating or editing the user key, to manually input the authentication ID (4).

The CPU then determines, at step 707, whether or not the current user is the administrator. If this determination is no, the CPU performs, at step 708, a login process of the currently created or edited user to switch the current user and then terminates the procedure. If this login process is cancelled at step 505, the CPU must switch the current account to the account of the guest rather than return it to the account of the original power user since the original USB memory has been detached from the mixer. At step 708, the CPU automatically switches the current account to the account of the created user, so that it is possible to immediately confirm the operation of the user account.

If the user key account setting button 1115 on the screen 1101 of FIG. 11 is turned on, the CPU performs a process subsequent to the "user key account setting" of FIG. 7a. First, the CPU performs a user selection process at step 709. This is a process in which a list of users corresponding to user key files 310 stored in a USB memory 110 currently connected to the mixer is displayed as shown in the user selection screen 803 of FIG. 8c so that a user, who will be subjected to the account setting, is selected from the displayed user list. The CPU then performs the procedure subsequent to step 702 for the selected user. This allows the change made on the screen of FIGS. 12a and 12b to be reflected in the user key file 310 of the selected user. Here, it is assumed that the user password (2) of the user key file 310 of the administrator stored in the flash memory 102 of the mixer is written as the authentication ID (4) of the U account data 312 of the user key file 310. This makes it possible to easily switch mixers which can be used by the user.

Figure 8C:
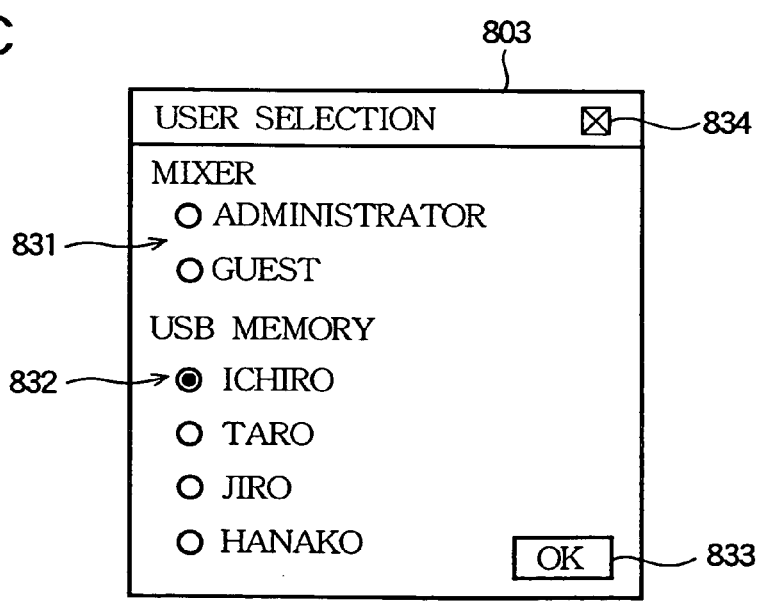

Since account setting may be performed not only for the user of the USB memory 110 but also for the "administrator" or the "guest", the screen of FIG. 8c displays a list of users of the mixer and a list of users of the USB memory 110 as denoted by "831" and "832". Since only the administrator has the authority to perform the account setting of the administrator and the guest, the user list 831 of the mixer is grayed out if the current user is a power user. "833" denotes an OK button and "834" denotes a close button.

Figure 7B:
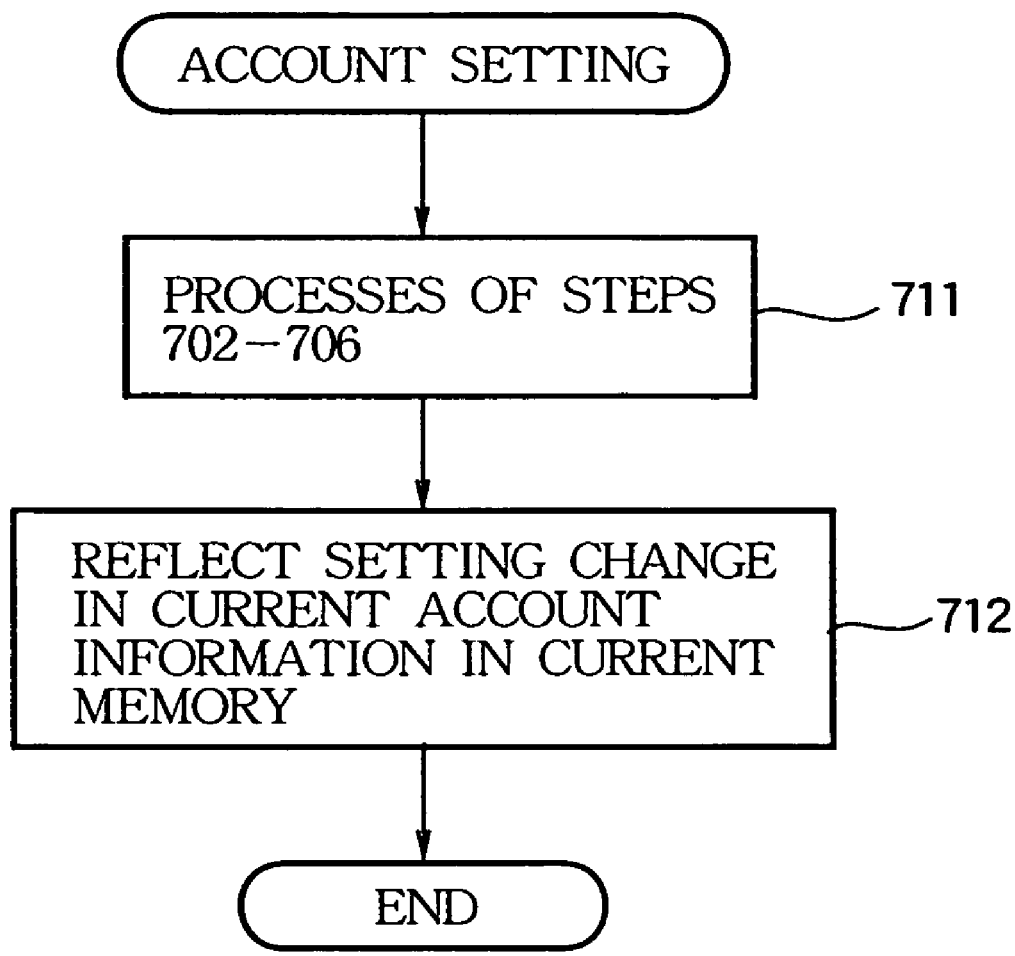

FIG. 7b shows a process that is performed when the account setting button 1111 of the current user is turned on on the screen 1101 of FIG. 11. At step 711, the CPU performs the same processes as the above steps 702 to 706 in which the account setting screen illustrated in FIG. 12 is displayed and a variety of setting changes is received. At step 712, the CPU reflects the setting changes in the current account information in the current memory and then terminates the procedure.

In the above embodiments, items of the setting file are allowed to be selected both when the setting file is saved (see FIG. 10a) and when it is loaded (see FIG. 10b). However, items of the setting file may be allowed to be selected only either when the setting file is saved or when it is loaded. In this case, it is more preferable that items of the setting file be allowed to be selected only when the setting file is loaded. In addition, instead of selecting items of the setting file when the setting file is saved or loaded, items of the setting file to be saved or loaded may be previously set on the setting file name setting screen of FIG. 12b so that the setting file is thereafter saved or loaded for the previously set items without querying the user about which items to be selected. Without being limited to the USB memory, the detachable storage medium includes any nonvolatile, rewritable storage medium such as a compact flash memory, an SD card (trademark), and an MMC card (trademark). In the above description, account setting items which the power user is allowed to set is limited to items which they have the authority to set. However, the limitation may be removed and the power user may be allowed to set all items regardless of their authority.

Figure 13:
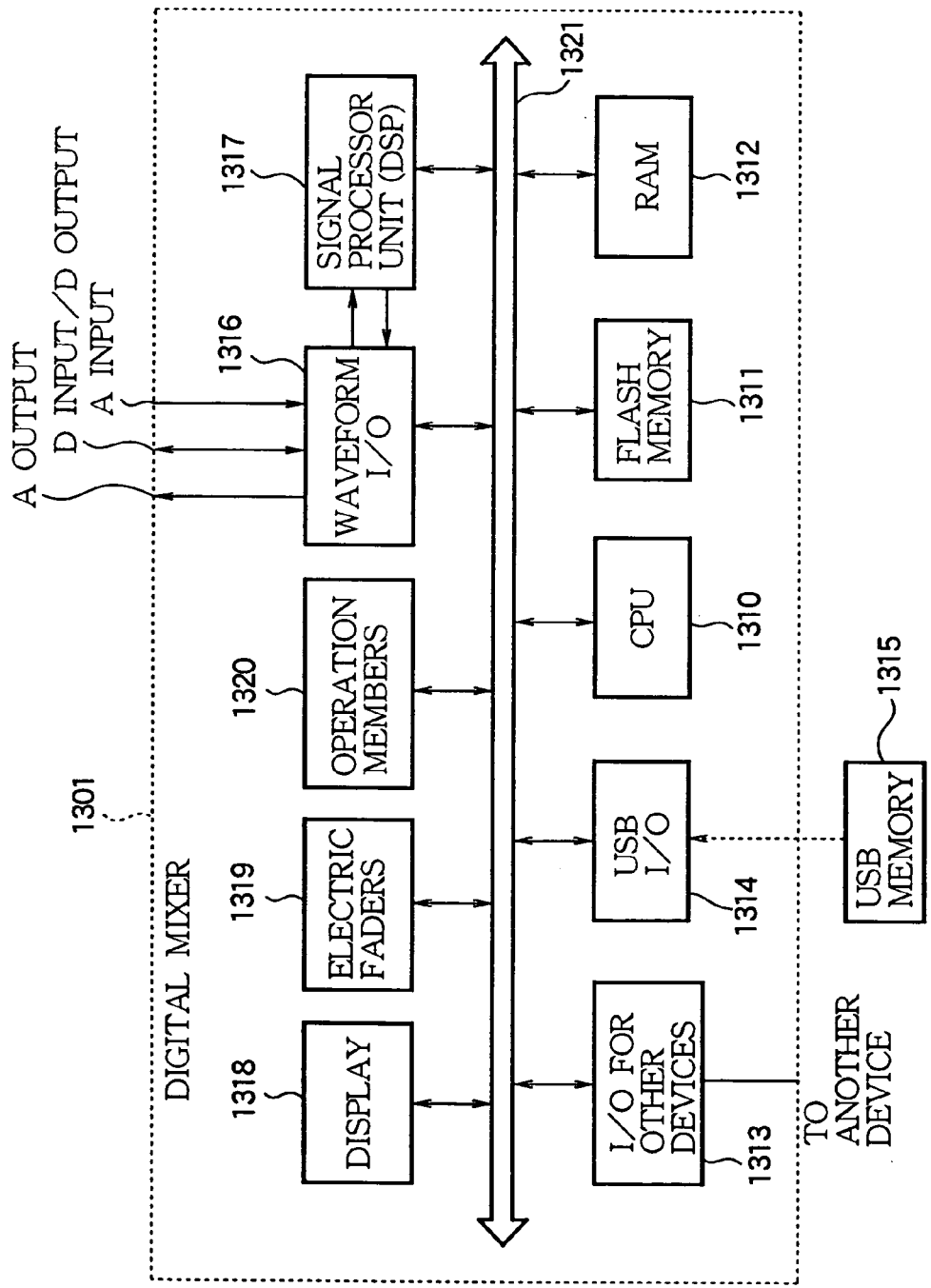
FIG. 13 is a block diagram of a digital mixer that is another embodiment of a digital mixer according to the present invention.

FIG. 13 is a block diagram showing another embodiment of the digital mixer according to the invention. The digital mixer 1301 according to the embodiment of the present invention shown in FIG. 13 includes a Central Processing Unit (CPU) 1310, a flash memory 1311, and a Random Access Memory (RAM) 1312. The CPU 1310 controls the overall operation of the digital mixer 1301. The CPU 1310 generates a control signal according to a manipulation of a mixing operation member. The flash memory 1311 stores user management data and operating software such as a mixing control program run by the CPU 1310. The flash memory 1311 is a rewritable, nonvolatile memory in which a scene memory region is set. This scene memory region stores scene data which is operation data used to perform mixing processes of a variety of scenes. The RAM 1312 sets therein a memory region corresponding to a work area of the CPU 1310, a current memory region in which operation data associated with the current mixing process is stored, and a region in which read user management data is stored. As described above, operating software is stored the flash memory 1311. The digital mixer can update the version of the operating software in the flash memory 1311 by rewriting the operating software. A different device such as a digital recorder is connected to the digital mixer 1301 via an I/O 1313 for other devices, which is an input/output interface 1313. The digital mixer 1301 further includes a USB interface (USB I/O) 1314. A USB memory 1315 in which user management data and the like is stored can be attached to the USB I/O 1314.

The digital mixer 1301 includes a waveform data interface (waveform I/O) 1316. The digital mixer 1301 receives and outputs all input and output signals via the waveform data interface 1316. The waveform I/O 1316 includes a plurality of A input ports through which analog signals are input, a plurality of A output ports through which analog signals are output, and a plurality of D input/output ports. The D input/output ports are bidirectional input/output ports through which digital signals are input to the digital mixer and digital signals are output from the digital mixer. The signal processing unit 1317 is constructed using a plurality of Digital Signal processors (DSP). The signal processing unit 1317 performs a mixing process or an effects process under control of the CPU 1310. The display unit 1318 includes a display, including a liquid crystal display or the like, for displaying a setting screen (or window) associated with the mixing process or the like and a display for displaying a scene number. Each electric fader 1319 is used to adjust the level of an input channel signal or an output channel signal. The electric fader 1319 can be manually or electrically operated to adjust the signal level. Operation members 1320 are mounted on an operating panel of the digital mixer. Each operation member 1320 includes a login/logout key, a scene-memory store/recall key, a user management data store/recall key, an assignment switch, a cursor moving key, an increment/decrement key, a rotary encoder, and an enter key. The assignment switch is used to assign channel strips provided for 1312 channels to output or input channels. The cursor moving key is used to move a cursor displayed on the display unit 1318. The increment/decrement key is used to increment and decrement a value to be set. The rotary encoder is used to select the set value. The enter key is used to confirm the set value. The elements 10 to 20 are connected to a bus 1321.

Figure 14:
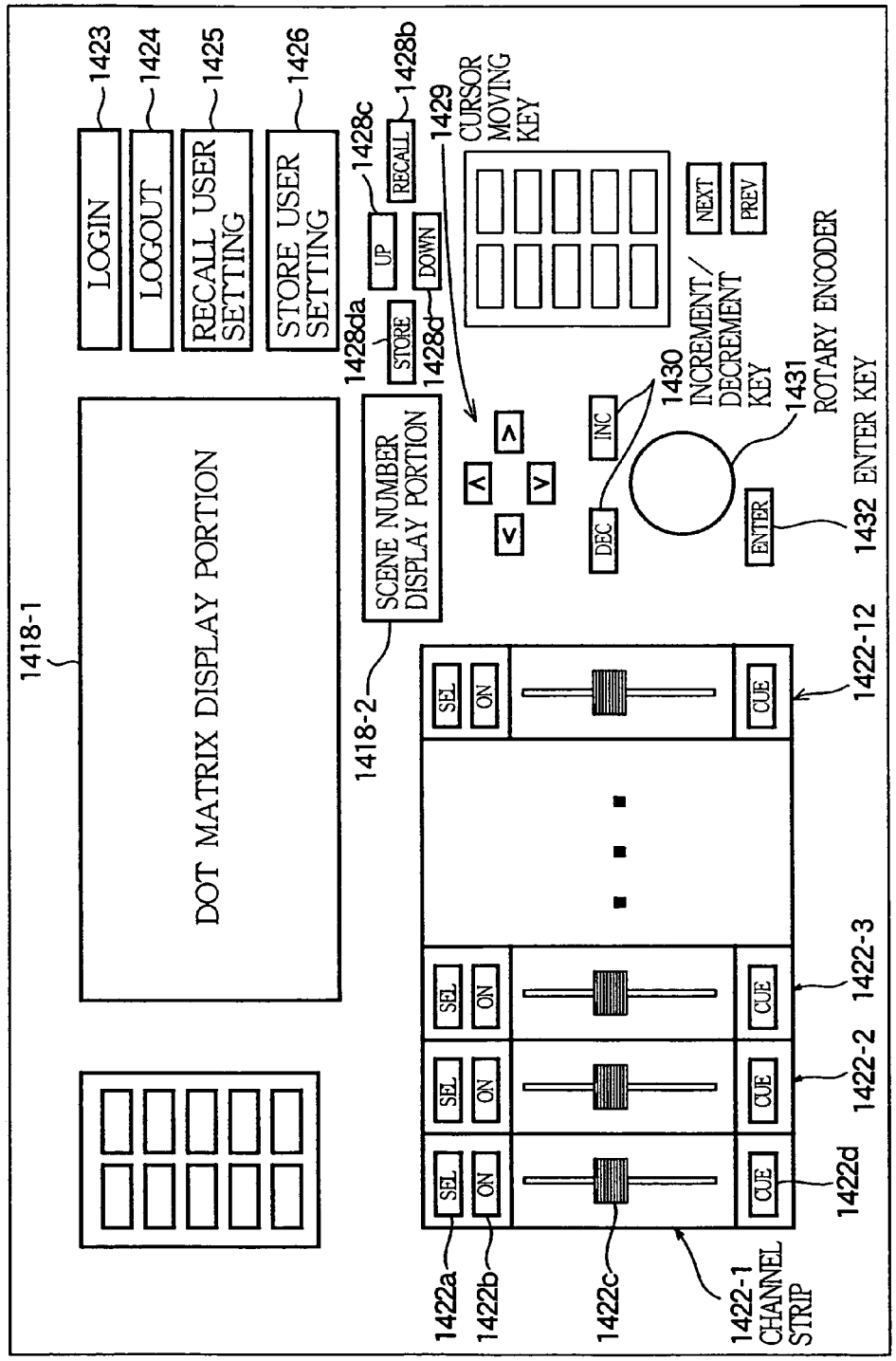
FIG. 14 is a schematic diagram of an external appearance of a panel of the digital mixer that is the embodiment of the digital mixer according to the present invention.

The digital mixer 1301 according to the present invention includes a panel which includes the operation members 1320. FIG. 14 illustrates an external appearance of the panel. As shown in FIG. 14, the display unit 1318 includes a dot matrix display portion 1418-1. Channel strips 1422-1, 1422-2, . . . , and 1422-12 of 12 channels are provided under the dot matrix display portion 1418-1. Each of the channel strips 1422-1, 1422-2, . . . , and 1422-12 includes a selection switch (SEL) 1422a used to select a channel to be assigned to the corresponding channel strip 1422-1, 1422-2, . . . , or 1422-12, a channel switch 1422b used to turn on the corresponding channel, a fader knob 1422c used to control the level of the assigned channel of the electric fader 1319, and a cue switch (CUE) 1422d used for sound inspection of the assigned channel. The digital mixer uses layers, each of which includes 12 channels assigned to the channel strips 1422-1, 1422-2, . . . , and 1422-12. The digital mixer can control all input channels and all output channels using the layers.

A login key 1423 and a logout key 1424 are provided to the right of the dot matrix display portion 1418-1. If the login key 1423 is manipulated, a login window for inputting a user name and a password is displayed on the dot matrix display portion 1418-1. This allows the user to perform a process for logging into the digital mixer. If the logout key 1424 is manipulated, a logout window is displayed on the dot matrix display portion 1418-1. This allows the user to perform a process for logging out of the digital mixer. A user setting recall key 1425 and a user setting store key 1426 are provided under the logout key 1424. If the user setting recall key 1425 is manipulated, user operation data copied to the RAM 1312 from the flash memory 1311 or the USB memory 1315 is recalled to the current memory. If the user setting store key 1426 is manipulated, the user operation data in the current memory is stored in the RAM 1312. A scene number display portion 1418-2, which is one display portion of the display unit 1318, a store key 1428a used to store scene data of the current memory in the scene memory, a recall key 1428b used to recall scene data from the scene memory to the current memory, and up and down keys 1428c and 1428d used to change a scene number of interest are provided to the lower right of the dot matrix display portion 1418-1. In addition, a cursor moving key 1429, an increment/decrement key 1430, a rotary encoder 1431, an enter key 1432 are arranged under the scene number display portion 1418-2. The cursor moving key 1429 is used to move a cursor displayed on the dot matrix display portion 1418-1 vertically or horizontally. The increment/decrement key 1430 is used to increment and decrement a variety of settable values. The rotary encoder 1431 is used to select one of a variety of settable values. The enter key 1432 is used to confirm a setting value selected using the increment/decrement key 1430 and the rotary encoder 1431.

Figure 15:
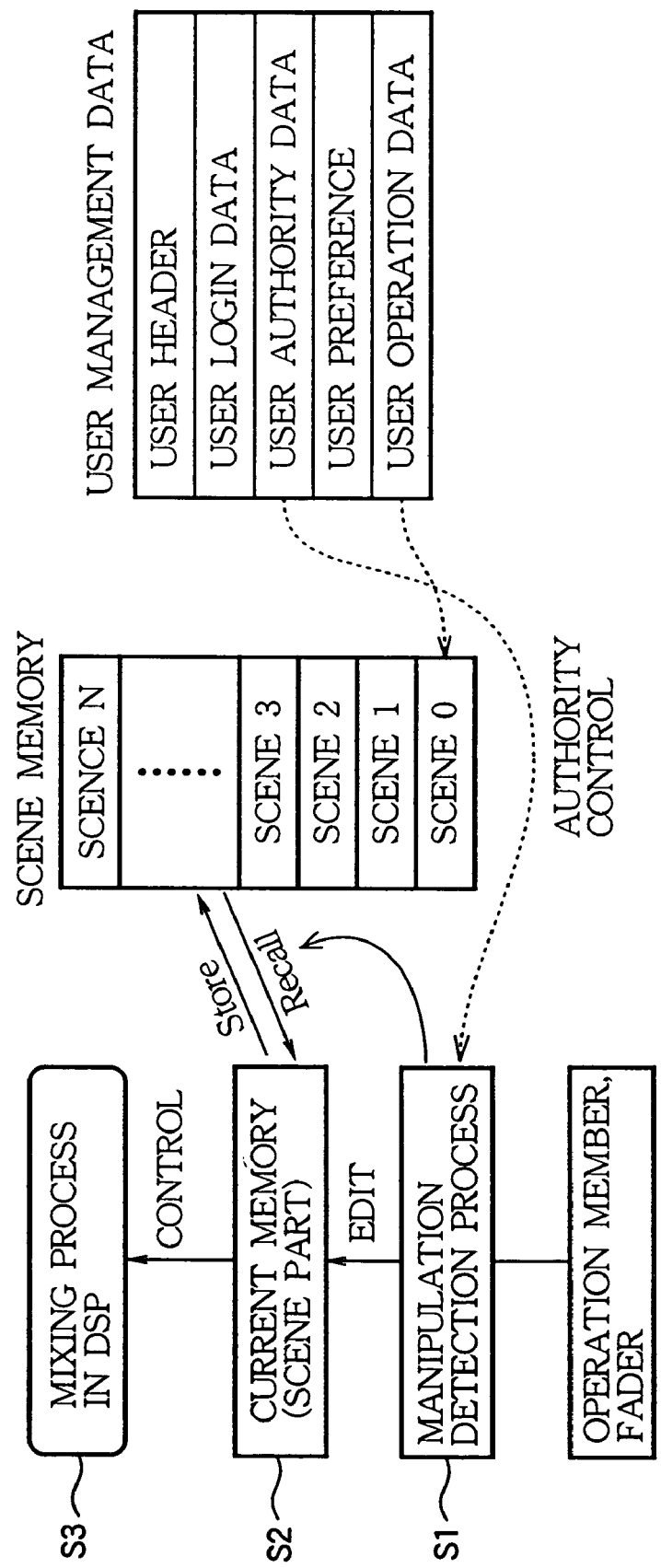
FIG. 15 is a flow chart of a process that the digital mixer according to the present invention performs when an electric fader or an operation member is manipulated, which is illustrated in conjunction with respective data structures of a scene memory and user management data.

FIG. 15 is a flow chart of a process that the digital mixer 1301 according to the present invention performs when an electric fader 1319 or an operation member 1320 is manipulated, which is illustrated in conjunction with respective data structures of a scene memory and user management data. The digital mixer 1301 scans the electric faders 1319 or the operation members 1320. If it is detected through the scanning that an electric fader 1319 or an operation member 1320 has been manipulated, then the digital mixer 1301 performs a manipulation detection process (step S1) as shown in FIG. 15. At step S1, the digital mixer 1301 detects the manipulated electric fader 1319 or operation member 1320 and also detects its manipulated result such as the amount of manipulation or the on/off state. The digital mixer 1301 then edits a corresponding data part of the current memory using data changed based on the manipulated result of the detected electric fader 1319 or operation member 1320 (step S2). The digital mixer 1301 controls a mixing process of the signal processing unit (DSP) 1317 using scene data in the current memory. Accordingly, the signal processing unit (DSP) 1317 performs the mixing process in which the manipulated result of the electric fader 1319 or operation member 1320 is reflected (step S3). In this case, the digital mixer 1301 obtains authority data of the logged-in user from user authority data in the user management data in the manipulation detection process of step S1. The digital mixer 1301 disables a manipulation which is not allowed within the authority of the user. If it is detected in the manipulation detection process that the recall key 1428b has been manipulated, the digital mixer 1301 recalls scene data of a number, which has been specified using the up/down keys 1428c and 1428d and displayed on the scene number display portion 1418-2, from the scene memory to the scene region of the current memory. If it is detected in the manipulation detection process that the store key 1428a has been manipulated, the digital mixer 1301 stores the scene data of the scene region of the current memory, as the scene data of the number specified using the up/down keys 1428c and 1428d and displayed on the scene number display portion 1418-2, in the scene memory.

FIG. 15 illustrates a data structure of the scene memory and a data structure of the user management data. The scene memory is set in the flash memory 1311. The digital mixer 1301 performs a mixing process for reproducing a variety of scenes such as a conference room, a banquet hall, a mini theater, and a multi-purpose hall. To accomplish this, the scene memory stores scene data of Scene 1, Scene 2, Scene 3, . . . , and Scene N. The user management data is stored in the flash memory 1311 or the USB memory 1315, which is an external memory. The user management data is used after loading it into the RAM 1312. The user management data includes a user header, user login data, user authority data, a user preference, and user operation data. The user header includes information indicating that this data is user management data, information indicating whether automatic recall of user operation data upon login is enabled or disabled, information indicating whether or not user operation data is included in the user management data, and the like. The user login data is authentication data including a user name and a password. The user authority data specifies a user level of allowed manipulations. The user preference defines a user-preferred window display mode and the like. The user operation data is used to control the mixing process of the signal processing unit (DSP) 1317. The contents of the user operation data are substantially identical to the contents of the scene data. Accordingly, when a user logs into the digital mixer, the digital mixer internally handles user operation data, included in corresponding user management data, as "Scene 0". If automatic recall of user operation data upon login is enabled, the user operation data is written to the scene region of the current memory when the user logs in. Accordingly, when the user logs into the mixer, the digital mixer is brought into a setting state that the user has set by themselves. This allows the user to immediately understand the setting state of the digital mixer 1301 and to manipulate the digital mixer 1301 accordingly.

The user authority data defines 4 user levels as a template. The user level of each individual account can be set to one of the four user levels. Manipulations allowed for each account can be set in more detail. The 4 user levels are "Guest", "General", "Power", and "Administrator" in the order of increasing authority. The manipulations allowed for the user levels are described below. Manipulations allowed for the lower user level are all allowed for each user level. Thus, only the additionally allowed manipulations are listed below for each user level. Although they are not listed below, manipulations allowed for the lower level are also included in manipulations allowed for each user level.

(1) Guest User (Guest)

Channel Strip CUE

A manipulation of the cue switch (CUE) 1422*d* shown in FIG. 14 is enabled.

Channel Strip ON

A manipulation of the channel switch 1422*b* shown in FIG. 14 is enabled.

Channel Strip Fader

A manipulation of the electric fader 1319 using the fader knob 1422*c* shown in FIG. 14 is enabled.

(2) General User (General)

Talkback

A manipulation for talkback between the operator and the staff or the like is enabled.

SceneRecall

A manipulation for recalling selected scene data from the scene memory to the current memory is enabled.

LibraryRecall

A manipulation for recalling an equalizer or compressor parameter set of input/output channels is enabled.

Layer Change

A manipulation for switching layers, each of which includes input/output channels of 12 channels assigned to channel strips of 12 channels, is enabled.

(3) Power User (Power)

SceneStore

A manipulation for storing scene data of the current memory in the scene memory is enabled.

LibraryStore

A manipulation for storing the parameter set is enabled.

InputPatch

A manipulation for setting an input patch is enabled.

OutputPatch

A manipulation for setting an output patch is enabled.

(4) Administrator User (Admin)

WordClock Setting

A manipulation for performing the setting of word clock synchronization is enabled.

Cascade Setting

A manipulation for performing the setting of cascade connection of a plurality of digital mixers is enabled.

MIDI Setting

A manipulation for performing the setting of MIDI message reception is enabled.

Setup

A manipulation for setting functions, such as a safe function used to prevent part of the data to be recalled from being recalled, is enabled.

Account

A manipulation for creating a setting user account or changing the authority thereof is enabled.

The "user account" generally includes a user name and password required for login and a user authority given to the user when logging in using the user name. In the embodiment of the present invention, the user account corresponds to login data and user authority data included in the user management data. However, "creating the user account" described above refers to creating the whole of single new user management data rather than creating login data and user authority data based on a new user name and password.

After one of the four user levels is set, the digital mixer can change the types of manipulations enabled for each account. The general user can edit operation data using the knob but cannot store the edited user operation data. The power or higher users also can store the edited user operation data. The general user also cannot perform individual setting of input/output patches. However, input/output patch switching data is included in the scene data. Accordingly, the general user can indirectly switch the input/output patches by recalling and switching the scene data. The power and higher users can switch individual patches. Also when a single user uses the digital mixer, it is possible to prepare respective accounts for use with scenes. The user authority of each account can be varied according to the scene corresponding to the account. For each scene, the user logs into the digital mixer with an account corresponding to the scene. When a manipulation prohibited for each scene is performed, the digital mixer can disable the manipulation, thereby preventing a mistaken manipulation. When the digital mixer 1301 is powered on, the digital mixer 1301 is set to a default user level without performing a login process. In this case, only the user having the administrator authority can set the default user level. Generally, the default user level is set to the guest user. When the digital mixer is used regularly without login, the default user level is preferably set to the general or higher user. In this case, in order to prevent malfunctions, the logged-in user is set to a user level lower than the default user level so that the user authority is set to be low.

Figure 16:
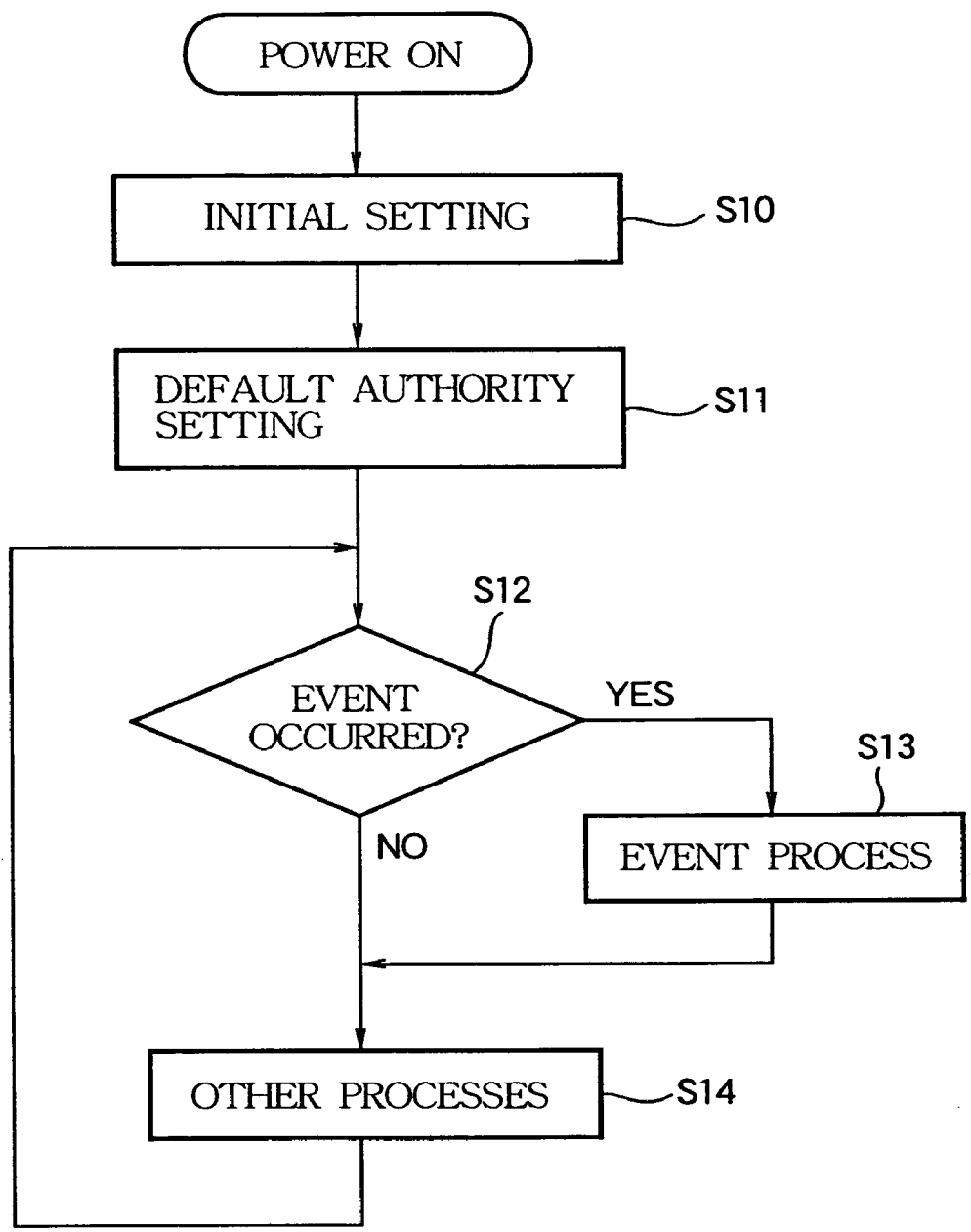

FIG. 16 is a flow chart of a power-on process that the digital mixer 1301 according to the present invention performs when it is powered on. As shown in FIG. 16, when it is powered on, the digital mixer 1301 according to the present invention performs an initial setting process, other than authority setting, at step S10 to initialize a variety of registers or the RAM 1312. At step S11, the digital mixer performs a default authority setting process. User management data of the default user has been stored in the flash memory 1311. This setting process uses only user authority data and a user preference included in the user management data and does not use user login data and user operation data therein. This allows the user to manipulate the digital mixer 1301 with the default authority without logging into the digital mixer 1301. At step S12, the digital mixer 1301 determines whether or not an event has occurred. If it is determined that an event has occurred, the digital mixer 1301 branches to step S13 to activate an event process corresponding to the event. Examples of the event include an USB memory insertion event in which the USB memory 1315 is inserted, a fader manipulation event in which an electric fader 1319 is manipulated, an operation member manipulation event in which one of a variety of operation members other than the electric faders is manipulated, a communication event occurring from a personal computer or another digital mixer connected in cascade to the digital mixer 1301, and a timer event. When the event process of step S13 is terminated, the digital mixer 1301 proceeds to step S14 to perform processes other than the event process. If it is determined at step S12 that no event has occurred, the digital mixer 1301 proceeds to step S14. Accordingly, the digital mixer 1301 repeats the processes of steps S12 to S14.

Figure 17:
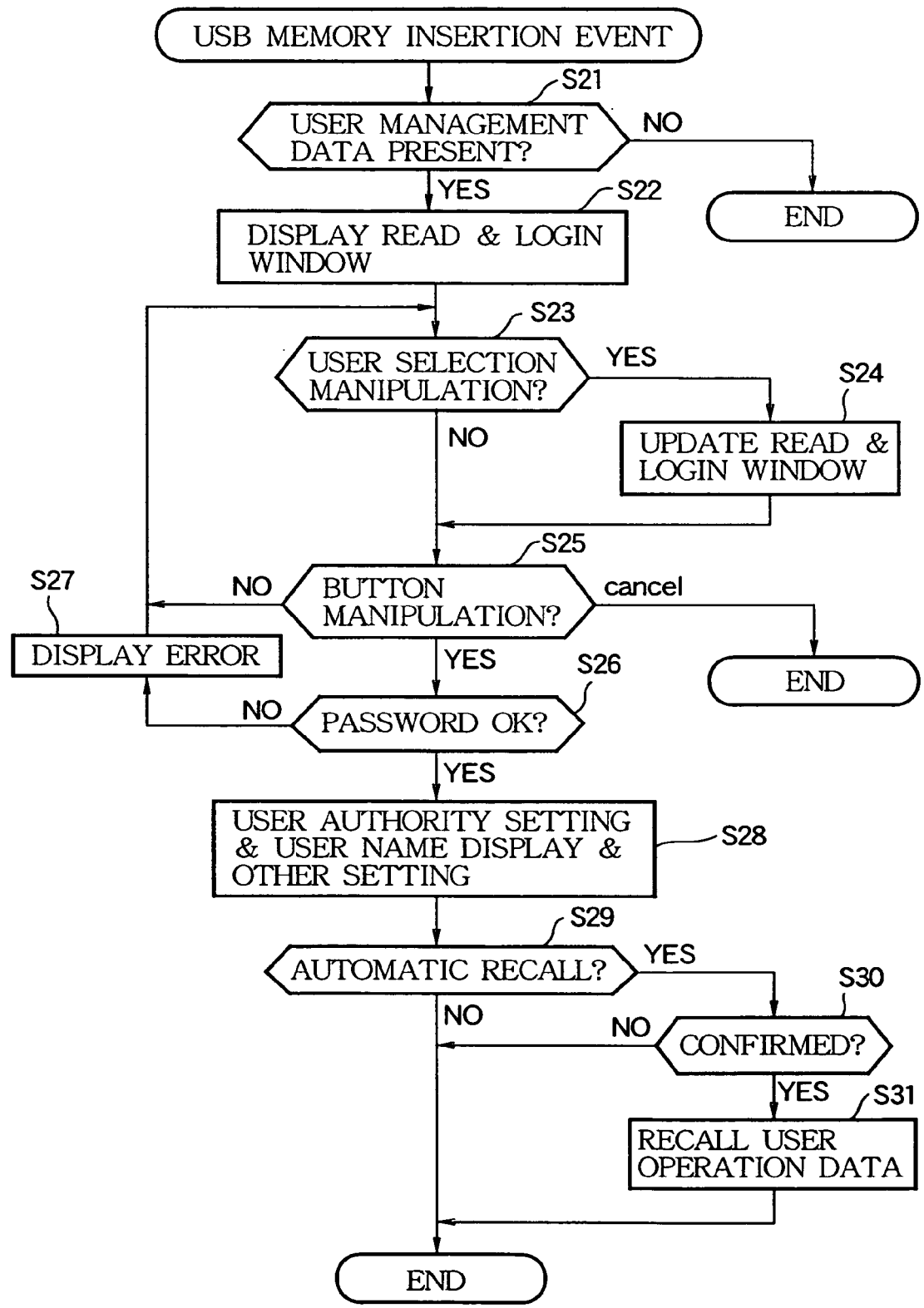
FIG. 17 is a flow chart of a USB memory insertion event process, which is an event process in the power-on process that the digital mixer according to the present invention performs.

FIG. 17 is a flow chart of a USB memory insertion event process, which is an event process performed at step S13. When the USB memory 1315 is attached to the USB I/O 1314, the digital mixer 1301 detects this attachment and activates a USB memory insertion event process. First, at step S21, the digital mixer reads information stored in the USB memory 15 and determines whether or not user management data is present in the USB memory 1315. If user management data is present in the USB memory 1315, the digital mixer 1301 authenticates the user management data. The digital mixer 1301 with the USB memory 1315 attached thereto has a unique device identification code (ID). The digital mixer performs the authentication by determining whether or not the device ID of the digital mixer 1301 is identical to a device ID of user management data stored in the attached USB memory 1315. If it is determined, with reference to a user header in the USB memory 1315, that user management data having the identical device ID is present in the USB memory 1315, the digital mixer 1301 reads the user management data from the USB memory 1315 and writes it to the RAM 1312. If a plurality of user management data stored in the USB memory 15 has the identical device ID, the digital mixer 1301 writes the plurality of user management data to the RAM 1312. The digital mixer 1301 disregards user management data having a different device ID from that of the digital mixer 1301. If it is determined that user management data having the identical ID is not present, the digital mixer 1301 terminates the USB memory insertion event without any further process. The digital mixer 1301 then returns to the power-on process. This allows the digital mixer 1301 to prevent login with user management data created by a different digital mixer of the same device type.

If it is determined at step S21 that user management data having the identical device ID is present, the digital mixer 1301 proceeds to step S22. At step S22, the digital mixer 1301 displays a read & login window on the dot matrix display portion 1318-1. This window has a user name entry field and a password entry field. A user corresponding to any user management data having the identical device ID, stored in the USB memory 1315, can be selected in the window. A password of the selected user can be entered in the window. At step S23, the digital mixer 1301 determines whether or not a user selection manipulation and a password input manipulation have been performed. If it is determined that the input manipulation has been performed, the digital mixer 1301 proceeds to step S24. At step S24, the digital mixer 1301 updates and displays the read & login window on the dot matrix display portion 1318-1. The selected user is displayed in the user field of the updated read & login window and the entered password is displayed in the password field. Instead of the entered password, symbols such as "*" may be displayed in the password field. When the process of step S24 is terminated, the digital mixer 1301 proceeds to step S25. Also when it is determined at step S23 that no input manipulation has been performed, the digital mixer 1301 proceeds to step S25. At step S25, the digital mixer determines whether or not an "OK" button or a "Cancel" button has been manipulated in the window displayed on the dot matrix display portion 1318-1. If it is determined that the OK button has been manipulated, the digital mixer proceeds to step S26. If it is determined that the Cancel button has been manipulated, the digital mixer deletes all user management data written to the RAM 1312, terminates the USB memory insertion event process, and returns to the power-on process. If it is determined that no button manipulation has been performed, the digital mixer returns to step S23 at which a user selection manipulation is repeated.

At step S26, the digital mixer 1301 authenticates the selected user. Specifically, the digital mixer determines whether or not the entered password is identical to a password of a corresponding user stored in the USB memory 1315. If it is determined that both passwords are identical, the digital mixer proceeds to step S28. If both passwords are different, the digital mixer branches to step S27 to display an error message indicating that both passwords are different. The digital mixer then returns to step S23 at which a user selection manipulation is repeated. At step S28, a user authority is set based on user authority data of the user for whom both the passwords are identical. The user name is displayed on the dot matrix display portion 1418-1 and other setting processes, such as setting of a user preference or preparation of user operation data of the user for whom both the passwords are identical, are performed. At step S29, the digital mixer 1301 determines, with reference to a user header of user management data of the user for whom both the passwords are identical, whether or not automatic recall upon login is enabled. If it is determined that automatic recall is enabled, the digital mixer branches to step S30. At step S30, the digital mixer asks the user whether or not to recall. Specifically, the digital mixer displays a dialog containing a "Recall OK" option and a "Recall NO" option on the dot matrix display portion 1418-1 and waits until the user inputs a key stroke to confirm whether or not to recall. If the user selects the "Recall OK" option, the digital mixer proceeds to step S31. At step S31, the user operation data prepared at step S28 is recalled from the RAM 1412 to the current memory. Finally, if the process of step S31 is terminated, if it is determined at step S29 that the automatic recall is disabled, or if the user selects the "Recall NO" at step S30, the digital mixer 1301 deletes user management data other than that of the logged-in user from the RAM 1412, terminates the USB memory insertion event process, and returns to the power-on process.

As described above, it is possible to log into the digital mixer using a user level based on user management data stored in the USB memory 1315 when the USB memory 1315 is attached to the digital mixer 1301. Even when the USB memory 1315 is detached from the mixer 1301 after the user logs in, the user authority of the logged-in user is maintained. Also in this state, no problem occurs even if the digital mixer 1301 edits the user operation data or recalls the user operation data again, since the user operation data of the logged-in user has been written in the RAM 1312. In this state, when a USB memory 1315' in which another user management data with the same device ID is stored is attached to the digital mixer 1301, it is possible to log into the digital mixer 1301 with a user authority of the user management data stored in the USB memory 1315'. This allows the user to manipulate the digital mixer 1301 with a different user authority.

A plurality of user management data can be stored in the USB memory 1315. For example, a single user prepares dedicated user management data of a different account for each scene. The user then sets user operation data of a scene corresponding to each account. In each scene, the user selects a corresponding account or user management data to log into the digital mixer 1301. This allows the user to set a mixing process corresponding to each scene. Here, user authority data of each user management data can be set appropriately for a scene in which the user management data is used. This makes it possible to specify manipulations to be prohibited in each scene. When a manipulation to be prohibited is performed by mistake, this manipulation can be automatically disabled, thereby preventing a mistaken manipulation.

In addition, the digital mixer 1301 activates the USB memory insertion event process shown in FIG. 17 also when the login key 1423 shown in FIG. 14 is manipulated. In this case, the digital mixer 1301 checks whether or not user management data has been stored in the flash memory 1311. Thereafter, the digital mixer performs the same processes as described above. Thus, it is possible to log into the digital mixer using a user level based on user management data stored in the flash memory 1311.

FIG. 18 is a flow chart of a logout manipulation event process. The logout manipulation event process is an event process that is performed at step S18 when the logout key 1424 is manipulated. When the logout key 1424 is manipulated to activate the logout manipulation event process, a logout window is displayed on the dot matrix display portion 1418-1 at step S40. The user can select whether to log out of the digital mixer or to cancel the logout by manipulating a corresponding button in the logout window. If it is determined at step S41 that the logout button has been manipulated, the digital mixer 1301 proceeds to step S42. If it is determined at step S41 that the logout cancellation button has been manipulated, the digital mixer 1301 terminates the logout manipulation event process without performing logout and returns to the power-on process. In the digital mixer, the user preference or user operation data may be changed during the mixing process. Accordingly, at step S42, a window asking whether to save the current data is displayed on the dot matrix display portion 1418-1 to allow the user to save the changed data. FIG. 19 illustrates an example of the "save the current data" window. This window is designed to allow the user to save the password, the user preference, and the user operation data. A check box is provided for each item at the head thereof and a "save" button and a "don't save" button are also displayed in the window. Checking the check box allows the digital mixer to save the current data. Each check box is automatically checked when corresponding data is changed after login. The user can optionally set whether or not the check box is to be automatically checked.

At step S43, it is determined which button the user has manipulated on the "save the current data" window shown in FIG. 19. If it is determined that the user has manipulated the "save" button, the digital mixer branches to step S44. At step S44, the digital mixer updates the checked password, user preference, or user operation data in the corresponding user management data. Specifically, in this update process, the digital mixer updates the corresponding user operation data in the flash memory 1311 or the USB memory 1315 with the changed user operation data in the RAM 1312. If the corresponding user management data is stored in the USB memory 1315 and the USB memory 1315 is not attached to the digital mixer 1301, then the digital mixer 1301 displays a message prompting the user to attach the USB memory 1315 to it on the dot matrix display portion 1418-1. The digital mixer 1301 waits until the USB memory 15 is attached to it and then updates the corresponding user management data in the USB memory 1315. Here, the user can cancel the saving in the USB memory 1315. When the process of step S44 is terminated, the digital mixer proceeds to step S45 to set a default user authority, to delete the logged-in user name, and to perform other setting. Accordingly, the logout manipulation event process is terminated. Also when it is determined at step S43 that the "don't save" button has been manipulated for the user operation data, the digital mixer proceeds to step S45.

As described above, when it is powered on, the digital mixer according to the present invention can be used with a preset default authority. The digital mixer according to the present invention can authenticate login data included in user management data saved in a USB memory or user management data saved in the digital mixer, thereby allowing the user to log into it with a user authority defined by the user management data. The digital mixer according to the present invention can automatically recall user operation data to the current data upon login. The user operation data is included in the user management data and is used to control a mixing processing unit. When the user logs into the mixer, the digital mixer according to the present invention recalls the user operation data, whereby it is brought into a setting state that the user has set by themselves. This allows the user to immediately understand the setting state of the digital mixer and to manipulate the digital mixer accordingly. A plurality of user management data can be stored in the USB memory. For example, when a plurality of user management data is stored, a single user can prepare a plurality of dedicated user management data corresponding respectively to scenes. The user can set user operation data of a scene corresponding to each account. In each scene, the user selects a corresponding account or user management data to log into the digital mixer 1301. This allows the user to set a mixing process corresponding to each scene. Thereafter, the user can set user authority data in each user management data to be varied according to a scene in which the user management data is used. For example, the user can previously disable manipulations that should not be performed, thereby preventing mistaken manipulations.

In the above description, the scene memory and current memory regions are set in the flash memory 1311. However, a hard disk device may instead be provided in the digital mixer and the scene memory and current memory regions may be set in the hard disk device.

The invention claimed is:

1. A digital mixer that provides audio signal processing functions to an operator, who has logged in as a user of the digital mixer, by inputting a password of the user, the digital mixer comprising:
   a display;
   a mounting unit for removably mounting a storage medium;
   a detector that detects when the storage medium is mounted on, or removed from, the mounting unit;

a determining portion that, upon the detector detecting that the storage medium is mounted on the mounting unit, determines whether a user key is stored in the mounted storage medium, and that, if it is determined that a user key is stored in the mounted storage medium, causes the display to display a login screen associated with a user corresponding to the user key; and a controller that automatically logs out the user upon the detector detecting that the storage medium is removed from the mounting unit.

2. The digital mixer according to claim 1, further comprising a switching portion that switches the user who has logged into the digital mixer to a guest user to log in the digital mixer after the operator has logged out due to the removal of the storage medium.

3. The digital mixer according to claim 1, wherein the controller allows an operator to log in as a specific user of the digital mixer with a specific user key, the specific user having an authority to edit a user key, and wherein, if an instruction to edit a user key is received from the operator who has logged in as a specific user, the controller maintains the authority of the specific user to edit the user key even if it is detected by the detector that the storage medium is removed from the mounting unit.

4. A digital mixer that provides audio signal processing functions to an operator, who has logged in as a user of the digital mixer, by inputting a password of the user, the digital mixer comprising:

a display;

a mounting unit for removably mounting a storage medium;

a detector that detects when the storage medium is mounted on, or removed from, the mounting unit;

a creating portion that creates or edits a user key;

a first determining portion that, upon the detector detecting that the storage medium is mounted on the mounting unit, determines whether a user key is being created or edited;

a second determining portion that determines whether a user key is stored in the mounted storage medium when the first determining portion determines that the user key is not being created or edited, and, upon determining that the user key is stored, causes the display to display a login screen enabling the operator to log in as a user corresponding to the stored user key; and a controller that allows a current operator to be kept logged in as a user of the digital mixer upon the first determining portion determining that the user key is being created or edited.

5. The digital mixer according to claim 4, wherein the controller is capable of automatically logging into the digital mixer with the created or edited user key after the created or edited user key is stored in the mounted storage medium.

6. A digital mixer that provides audio signal processing functions to an operator, who has logged in as a user of the digital mixer, by inputting a password of the user, the digital mixer comprising:

a storage having stored a user key of a guest, said user key specifying an access privilege of the guest;

a second storage that stores a user key including a password of a user and authority data for the user;

a controller automatically logging in as the guest of the digital mixer using the user key of the guest when power of the digital mixer is turned on, wherein, upon issuance of an instruction to log in a user other than the guest, the controller allows the operator to log in as a user of the digital mixer using the user key of the user in the second storage after confirming a password inputted by the operator coincides with the password of the user in the user key of the user, and wherein the controller automatically logs in as the guest of the digital mixer using the user key of the guest when the operator logs out from the digital mixer; and a setting portion that sets and changes the authority of the guest based on an instruction of a specific user who has a specific authority to set and change the authority of the guest.

7. The digital mixer according to claim 6, wherein the controller allows, after login of the digital mixer has been performed with a user key of a user other than the guest, an operator to log in as another user of the digital mixer with a user key of another user other than the guest, and automatically logs in as the guest of the digital mixer when the operator logs out said another user.

8. The digital mixer according to claim 6, wherein the controller prohibits the operator to log out the guest from the digital mixer when the guest has logged into the digital mixer with the user key of the guest.

9. A digital mixer that provides audio signal processing functions to an operator, who has logged in as a user of the digital mixer, by inputting a password of the user, the digital mixer comprising:

a memory having stored a password of an administrator;

a storage medium that can be attached to and detached from the digital mixer and that stores an identification code of a user and a password of the user and also stores the password of the administrator of the digital mixer as an authentication code;

a comparing portion that compares the authentication code stored in the storage medium with the password of the administrator stored in the memory when the user logs into the digital mixer by attaching and connecting the storage medium to the digital mixer; and a control portion that prompts the operator to input a password if it is confirmed by the comparison portion that the authentication code is identical to the password of the administrator, and that allows the operator to log in as a user of the digital mixer if the operator inputs the password that coincides with the password of the user stored in the storage medium.

10. The digital mixer according to claim 9, wherein the control portion prompts the operator to input the password of the administrator of the digital mixer when it is not confirmed that the authentication code is identical to the password of the administrator and the login of the user is denied, and allows the operator to log in as the user if the operator inputs the password of the administrator of the digital mixer.

11. The digital mixer according to claim 10, further comprising a writing portion that writes the password of the administrator of the digital mixer inputted by the operator into the storage medium, as the authentication code of the storage medium.

12. A digital mixer having a current memory, comprising:

a mixing portion that performs a mixing process on audio signals inputted through a plurality of input channels and that outputs a mixed audio signal through an output channel;

a storage that stores user management data including user login data which contains a user name of a user and a password of the user, and stores user operation data which is set for the user in association with the mixing process; and a setting portion that, when an operator logs in as the user of the digital mixer after the operator is authenticated based on the user login data of the user, reads user operation data corresponding to a particular user from the storage and sets the read user operation data in the current memory so that the mixing portion performs the mixing process based on the user operation data set in the current memory.

13. The digital mixer according to claim 12, wherein the storage stores the user operation data in the form of a plurality of scene data in correspondence to a plurality of users, and the setting portion sets the scene data corresponding to the particular user who logged into the digital mixer.

14. The digital mixer according to claim 12, wherein the storage is provided in the form of an external storage medium which stores the user management data, the digital mixer further comprising an authentication portion operative when the external storage medium is attached to the digital mixer, for performing authentication and login based on the user login data included in the user management data stored in the external storage medium, so that the setting portion automatically recalls the user operation data to the current memory from the external storage medium.

15. The digital mixer according to claim 14 having unique device identification information, wherein the authentication portion performs the login by additionally authenticating device identification information included in the user management data stored in the attached external storage medium with reference to the unique device identification information of the digital mixer.

16. The digital mixer according to claim 14, wherein the external storage medium stores a plurality of user management data, such that one of the user management data can be selected from the plurality of the user management data to log into the digital mixer using the selected user management data, and different user authorities can be given to the plurality of the user management data.

17. The digital mixer according to claim 12, wherein the setting portion reads user management data corresponding to the particular user who logs into the digital mixer, then reads a name of user operation data corresponding to the particular user from the read user management data, and reads the user operation data identified by the read name, so that the setting portion sets the read user operation data in the current memory only if the authentication of the particular user is performed based on the user login data, the name of the user operation data is written in the read user management data, and the user operation data identified by the read name is present in the storage.

18. The digital mixer according to claim 12, further comprising a display device, wherein the setting portion displays a list of various items of the user operation data for enabling the particular user to select desired ones of the items of the user operation data, and sets only the selected items of the read user operation data in the current memory.

19. The digital mixer according to claim 12, wherein the storage comprises an internal storage device integrated in the digital mixer.

20. The digital mixer according to claim 19, wherein the internal storage device stores one set of the user management data and the user operation data corresponding to an administrative user of the digital mixer.

21. The digital mixer according to claim 19, wherein the internal storage device stores one set of the user management data and the user operation data corresponding to a guest user.

22. The digital mixer according to claim 12, wherein the storage comprises an external storage device removably attached to the digital mixer.

23. The digital mixer according to claim 22, wherein the external storage device stores at least one set of the user management data and the user operation data corresponding to a regular user other than an administrative user and a guest user.

24. A method of controlling a digital mixer that has a mounting unit for removably mounting a storage medium and that provides audio signal processing functions to an operator, who has logged in as a user of the digital mixer by inputting a password of the user, the method comprising the steps of:
    detecting whether the storage medium is mounted on, or removed from, the mounting unit;
    upon detecting that the storage medium is mounted on the mounting unit, determining whether a user key is stored in the mounted storage medium;
    displaying a login screen associated with a user corresponding to a user key if the user key is stored in the mounted storage medium; and
    automatically log out the user from the digital mixer upon detecting that the storage medium is removed from the mounting unit.

25. A method of controlling a digital mixer that has a mounting unit for removably mounting a storage medium and that provides audio signal processing functions to an operator, who has logged in as a user of the digital mixer by inputting a password of the user, the method comprising the steps of:
    detecting when the storage medium is mounted on, or removed from, the mounting unit;
    permitting the creation or editing of a user key;
    determining whether a user key is being created or edited upon detecting that the storage medium is mounted on the mounting unit;
    determining whether a user key is stored in the mounted storage medium when the user key is not being created or edited;
    if it is determined that the user key is stored, displaying a login screen enabling the operator to log in as a user corresponding to the stored user key of the digital mixer;
    maintaining a current operator logon in as a user of the digital mixer upon determining the user key is being created or edited; and
    designating the mounted storage medium as a target storage medium in which the created or edited user key is to be stored.

26. A method of controlling a digital mixer that has storages and that provides audio signal processing functions to an operator, who has logged in as a user of the digital mixer, by inputting password of the user, the method comprising the steps of:
    storing a user key of a guest in a storage, the user key of the guest including authority data specifying an authority of the guest as a default user;
    storing a user key in another storage, the key including a user password of a user and authority data for the user other than the guest;
    automatically logging in as the guest of the digital mixer using the user key of the guest when power of the digital mixer is turned on;
    upon issuance of an instruction to log in a user other than the guest, permitting the operator to log in as a user of the digital mixer using the user key of the user in the second storage after confirming a password inputted by the operator coincides with the password of the user in the user key of the user;

automatically logging in as the guest of the digital mixer using the user key of the guest when the operator logs out from the digital mixer; and setting and changing the authority of the guest based on an instruction of a specific user who has a specific authority to set and change the authority of the guest.

27. A method of controlling a digital mixer having a memory for storing a password of an administrator who manages the digital mixer and a storage medium attachable to and detachable from the digital mixer, the storage medium storing an identification code of a user and a password of the user and also storing the password of the administrator of the digital mixer as an authentication code, the digital mixer providing audio signal processing functions to an operator, who has logged in as a user of the digital mixer, by inputting a password of the user, the method comprising the steps of:

comparing the authentication code stored in the storage medium with the password of the administrator memorized in the memory when the user logs into the digital mixer by attaching and connecting the storage medium to the digital mixer;

prompting the operator to input a password if it is confirmed that the authentication code is identical to the password of the administrator; and allowing the operator to log in as a user of the digital mixer if the operator inputs the password that coincides with the password of the user stored in the storage medium.

28. A non-transitory machine readable medium for use in a digital mixer that has a central processing unit and a mounting unit for removably mounting a storage medium and that provides audio signal processing functions to an operator, who has logged in as a user of the digital mixer by inputting a password of the user, the non-transitory machine readable medium containing a computer program executable by the central processing unit for causing the digital mixer to perform a method comprising the steps of:

detecting whether the storage medium is mounted on, or removed from, the mounting unit;

upon detecting that the storage medium is mounted on the mounting unit, determining whether a user key is stored in the mounted storage medium;

displaying a login screen associated with a user corresponding to a user key if the user key is stored in the mounted storage medium; and automatically log out the user from the digital mixer upon detecting that the storage medium is removed from the mounting unit.

29. A non-transitory machine readable medium for use in a digital mixer that has a central processing unit and a mounting unit for removably mounting a storage medium and that provides audio signal processing functions to an operator, who has logged in as a user of the digital mixer by inputting a password of the user, the non-transitory machine readable medium containing a computer program executable by the central processing unit for causing the digital mixer to perform a method comprising the steps of:

detecting when the storage medium is mounted on, or removed from, the mounting unit;

permitting the creation or editing of a user key;

determining whether a user key is being created or edited upon detecting that the storage medium is mounted on the mounting unit;

determining whether a user key is stored in the mounted storage medium when the user key is not being created or edited;

if it is determined that the user key is stored, displaying a login screen enabling the operator to log in as a user corresponding to the stored user key of the digital mixer;

maintaining a current operator logged on as a user of the digital mixer upon determining the user key is being created or edited; and designating the mounted storage medium as a target storage medium in which the created or edited user key is to be stored.

30. A non-transitory machine readable medium for use in a digital mixer that has a central processing unit and storages for storing user keys and that provides audio signal processing functions to an operator, who has logged in as a user of the digital mixer, by inputting a password of the user, the non-transitory machine readable medium containing a computer program executable by the central processing unit for causing the digital mixer to perform a method comprising the steps of:

storing a user key of a guest in a storage, the user key of the guest including authority data specifying an authority of the guest as a default user; storing a user key in another storage, the user key including a password of a user and authority data for the user other than the guest;

automatically logging in as the guest of the digital mixer using the user key of the guest when power of the digital mixer is turned on;

upon issuance of an instruction to log in a user other than the guest, permitting the operator to log in as a user of the digital mixer using the user key of the user in the second storage after confirming a password inputted by the operator coincides with the password of the user in the user key of the user;

automatically logging in as the guest of the digital mixer using the user key of the guest when the operator logs out from the digital mixer; and setting and changing the authority of the guest based on an instruction of a specific user who has a specific authority to set and change the authority of the guest.

31. A non-transitory machine readable medium for use in a digital mixer that has a central processing unit, a memory for storing a password of an administrator who manages the digital mixer and a storage medium attachable to and detachable from the digital mixer, the storage medium storing an identification code of a user and a password of the user and also storing the password of the administrator of the digital mixer as an authentication code, the digital mixer providing audio signal processing functions to an operator, who has logged in as a user of the digital mixer, by inputting a password of the user, the non-transitory machine readable medium containing a computer program executable by the central processing unit for causing the digital mixer to perform a method comprising the steps of:

comparing the authentication code stored in the storage medium with the password of the administrator memorized in the memory when the user logs into the digital mixer by attaching and connecting the storage medium to the digital mixer;

prompting the operator to input a password if it is confirmed that the authentication code is identical to the password of the administrator, and allowing the operator to log in as a user of the digital mixer if the operator inputs the password that coincides with the password of the user stored in the storage medium.

* * * * *